(12) United States Patent
Stefik et al.

(10) Patent No.: US 8,549,016 B2
(45) Date of Patent: Oct. 1, 2013

(54) SYSTEM AND METHOD FOR PROVIDING ROBUST TOPIC IDENTIFICATION IN SOCIAL INDEXES

(75) Inventors: Mark J. Stefik, Portola Valley, CA (US); Lance E. Good, Cupertino, CA (US); Sanjay Mittal, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 347 days.

(21) Appl. No.: 12/608,929

(22) Filed: Oct. 29, 2009

(65) Prior Publication Data

US 2010/0125540 A1 May 20, 2010

Related U.S. Application Data

(60) Provisional application No. 61/115,024, filed on Nov. 14, 2008.

(51) Int. Cl.
*G06F 17/30* (2006.01)

(52) U.S. Cl.
USPC .......................... 707/749; 707/758; 707/781

(58) Field of Classification Search
CPC .................................. G06F 17/00; G06F 17/30
See application file for complete search history.

(56) References Cited

U.S. PATENT DOCUMENTS

| | | | | |
|---|---|---|---|---|
| 3,803,363 A | * | 4/1974 | Lee | 375/240 |
| 4,109,938 A | * | 8/1978 | Mitchell et al. | 283/43 |
| 4,369,886 A | * | 1/1983 | Lane et al. | 209/564 |
| 4,404,676 A | * | 9/1983 | DeBenedictis | 714/798 |
| 5,241,671 A | * | 8/1993 | Reed et al. | 1/1 |
| 5,245,647 A | * | 9/1993 | Grouffal et al. | 377/20 |
| 5,257,939 A | | 11/1993 | Robinson et al. | |
| 5,369,763 A | | 11/1994 | Biles | |
| 5,530,852 A | | 6/1996 | Meske et al. | |
| 5,671,342 A | | 9/1997 | Millier et al. | |
| 5,680,511 A | | 10/1997 | Baker et al. | |

(Continued)

FOREIGN PATENT DOCUMENTS

| | | |
|---|---|---|
| EP | 1571579 | 9/2005 |
| WO | 2005073881 | 8/2005 |
| WO | 2007047903 | 4/2007 |

OTHER PUBLICATIONS

Stefik, Mark, "Social Indexing," Apr. 5-10, 2008, CHI 2008, Sensemaking Workshop, pp. 1-9.*

(Continued)

*Primary Examiner* — Farhan Syed
(74) *Attorney, Agent, or Firm* — Patrick J.S. Inouye; Makiko Coffland

(57) ABSTRACT

A computer-implemented method for providing robust topic identification in social indexes is described. Electronically-stored articles and one or more indexes are maintained. Each index includes topics that each relate to one or more of the articles. A random sampling and a selective sampling of the articles are both selected. For each topic, characteristic words included in the articles in each of the random sampling and the selective sampling are identified. Frequencies of occurrence of the characteristic words in each of the random sampling and the selective sampling are determined. A ratio of the frequencies of occurrence for the characteristic words included in the random sampling and the selective sampling is identified. Finally, for each topic, a coarse-grained topic model is built, which includes the characteristic words included in the articles relating to the topic and scores assigned to those characteristic words.

22 Claims, 13 Drawing Sheets

(56) References Cited

U.S. PATENT DOCUMENTS

| | | | |
|---|---|---|---|
| 5,724,567 A | 3/1998 | Rose et al. | |
| 5,784,608 A | 7/1998 | Meske et al. | |
| 5,907,677 A | 5/1999 | Glenn et al. | |
| 5,907,836 A | 5/1999 | Sumita et al. | |
| 5,937,422 A * | 8/1999 | Nelson et al. | 715/206 |
| 5,953,732 A | 9/1999 | Meske et al. | |
| 6,021,403 A * | 2/2000 | Horvitz et al. | 706/45 |
| 6,044,083 A * | 3/2000 | Citta et al. | 370/441 |
| 6,052,657 A * | 4/2000 | Yamron et al. | 704/9 |
| 6,064,952 A | 5/2000 | Imanaka et al. | |
| 6,137,283 A * | 10/2000 | Williams et al. | 324/76.12 |
| 6,233,570 B1 * | 5/2001 | Horvitz et al. | 706/11 |
| 6,233,575 B1 | 5/2001 | Agrawal et al. | |
| 6,240,378 B1 | 5/2001 | Imanaka et al. | |
| 6,247,002 B1 | 6/2001 | Steels | |
| 6,269,361 B1 | 7/2001 | Davis et al. | |
| 6,285,987 B1 | 9/2001 | Roth et al. | |
| 6,289,342 B1 * | 9/2001 | Lawrence et al. | 1/1 |
| 6,292,830 B1 * | 9/2001 | Taylor et al. | 709/224 |
| 6,310,645 B1 * | 10/2001 | Lapushin et al. | 348/192 |
| 6,397,211 B1 | 5/2002 | Cooper | |
| 6,546,399 B1 * | 4/2003 | Reed et al. | 1/1 |
| 6,598,045 B2 | 7/2003 | Light et al. | |
| 6,772,120 B1 | 8/2004 | Moreno et al. | |
| 6,804,688 B2 | 10/2004 | Kobayashi et al. | |
| 6,978,277 B2 * | 12/2005 | Reed et al. | 1/1 |
| 6,981,040 B1 | 12/2005 | Konig et al. | |
| 7,062,485 B1 | 6/2006 | Jin et al. | |
| 7,082,437 B2 * | 7/2006 | Reed et al. | 1/1 |
| 7,092,888 B1 | 8/2006 | McCarthy et al. | |
| 7,200,606 B2 | 4/2007 | Elkan | |
| 7,275,061 B1 | 9/2007 | Kon et al. | |
| 7,281,022 B2 | 10/2007 | Gruhl et al. | |
| 7,320,000 B2 | 1/2008 | Chitrapura et al. | |
| 7,333,984 B2 * | 2/2008 | Oosta | 707/750 |
| 7,426,557 B2 | 9/2008 | Gruhl et al. | |
| 7,467,202 B2 | 12/2008 | Savchuk | |
| 7,496,567 B1 | 2/2009 | Steichen | |
| 7,502,815 B1 * | 3/2009 | Drimer | 708/255 |
| 7,548,917 B2 | 6/2009 | Nelson | |
| 7,567,959 B2 | 7/2009 | Patterson | |
| 7,600,017 B2 | 10/2009 | Holtzman et al. | |
| 7,640,488 B2 * | 12/2009 | Bar-Yossef et al. | 715/205 |
| 7,685,224 B2 | 3/2010 | Nye | |
| 7,707,206 B2 | 4/2010 | Encina et al. | |
| 7,747,593 B2 | 6/2010 | Patterson et al. | |
| 7,809,723 B2 | 10/2010 | Liu et al. | |
| 7,890,485 B2 | 2/2011 | Malandain et al. | |
| 2002/0124004 A1 * | 9/2002 | Reed et al. | 707/100 |
| 2002/0161838 A1 | 10/2002 | Pickover et al. | |
| 2004/0059708 A1 | 3/2004 | Dean et al. | |
| 2005/0097436 A1 | 5/2005 | Kawatani | |
| 2005/0165736 A1 * | 7/2005 | Oosta | 707/2 |
| 2005/0198056 A1 * | 9/2005 | Dumais et al. | 707/101 |
| 2005/0226511 A1 | 10/2005 | Short | |
| 2005/0278293 A1 * | 12/2005 | Imaichi et al. | 707/1 |
| 2006/0167930 A1 | 7/2006 | Witwer et al. | |
| 2007/0050356 A1 | 3/2007 | Amadio | |
| 2007/0156622 A1 | 7/2007 | Akkiraju et al. | |
| 2007/0179977 A1 * | 8/2007 | Reed et al. | 707/104.1 |
| 2007/0214097 A1 | 9/2007 | Parsons et al. | |
| 2007/0239530 A1 | 10/2007 | Datar et al. | |
| 2007/0244690 A1 | 10/2007 | Peters | |
| 2007/0260508 A1 | 11/2007 | Barry et al. | |
| 2007/0260564 A1 | 11/2007 | Peters et al. | |
| 2007/0271086 A1 | 11/2007 | Peters et al. | |
| 2008/0040221 A1 | 2/2008 | Wiseman et al. | |
| 2008/0065600 A1 | 3/2008 | Batteram et al. | |
| 2008/0091510 A1 * | 4/2008 | Crandall et al. | 705/10 |
| 2008/0126319 A1 | 5/2008 | Bukai et al. | |
| 2008/0133482 A1 | 6/2008 | Anick et al. | |
| 2008/0201130 A1 | 8/2008 | Peters et al. | |
| 2008/0307326 A1 | 12/2008 | Gruhl et al. | |
| 2009/0099839 A1 * | 4/2009 | Stefik | 704/9 |
| 2009/0099996 A1 * | 4/2009 | Stefik | 706/54 |
| 2009/0164475 A1 * | 6/2009 | Pottenger | 707/10 |
| 2009/0248662 A1 * | 10/2009 | Murdock | 707/5 |
| 2010/0042589 A1 | 2/2010 | Smyros et al. | |
| 2010/0057536 A1 * | 3/2010 | Stefik et al. | 705/10 |
| 2010/0057577 A1 * | 3/2010 | Stefik et al. | 705/14.73 |
| 2010/0057716 A1 * | 3/2010 | Stefik et al. | 707/5 |
| 2010/0058195 A1 * | 3/2010 | Stefik et al. | 715/744 |
| 2010/0070485 A1 | 3/2010 | Parson et al. | |
| 2010/0083131 A1 | 4/2010 | You | |
| 2010/0114561 A1 | 5/2010 | Yasin | |
| 2010/0125540 A1 * | 5/2010 | Stefik et al. | 706/12 |
| 2010/0191741 A1 * | 7/2010 | Stefik et al. | 707/748 |
| 2010/0191742 A1 * | 7/2010 | Stefik et al. | 707/748 |
| 2010/0191773 A1 * | 7/2010 | Stefik et al. | 707/797 |
| 2010/0278428 A1 | 11/2010 | Terao | |
| 2011/0099133 A1 * | 4/2011 | Chang et al. | 706/12 |
| 2011/0145348 A1 * | 6/2011 | Benyamin et al. | 709/206 |

OTHER PUBLICATIONS

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).

G. Linden, "People Who Read This Article Also Read . . . " IEEE Spectrum, vol. 45, No. 3, pp. 46-60 (Mar. 1, 2008).

Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).

K. Lerman, "Social Information Processing in News Aggregation," IEEE Computer Society, vol. 11, No. 6, pp. 16-28 (Nov. 1, 2007).

Yu et al, "PEBL: Positive Example Based Learning for Web Page Classification Using SVM," Proc. of ACM SIGKDD International Conference on Knowledge Discovery and Data Mining (2002).

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd. , vol. 39, No. 1, pp. 45-65 (Jan. 1, 2003).

C. Anderson, "The Long Tail: Why the Future of Business is Selling Less of More," 2006, Chapter 1, pp. 1-26, Hyperion Press, New York.

Schutze H., "The Hypertext Concordance: A Better Back-of-the-Book Index," 1998, Proceedings of Workshop on Computational Technology, pp. 101-104, Montreal, Canada.

Arampatzis et al., "An Evaluation of Linguistically-Motivated Indexing Schemes," 2000, Proceedings of the BCSIRSG.

Biebricher et al., "The Automatic Indexing System AIR/PHYS—1997, From Research to Application," In Readings in Information Retrieval, Morgan Kaufmann Publishers, San Francisco.

G. Sacco, "Dynamic Taxonomies and Guided Searches," Journal of the American Society for Information Science and Technology, vol. 57, Issue 6, Apr. 2006.

Haav et al., "A Survey of Concept-Based Information Retrieval Tools on the Web," http://greta.cs.ioc.ee/~helemai/HaavLubiADBIS2001.pdf, 2001.

Brin et al., "The Anatomy of a Large-Scale Hypertextual Web Search Engine," Paper presented at the Seventh International Conference on World Wide Web. Apr. 14-18, 1998, Brisbane, Australia.

Card et al., "Readings in Information Visualization: Using Vision to Think," 1999, Section 3 Interaction, pp. 231-259, 295-306, Morgan Kaufmann Publishers, San Francisco.

Chi et al., "EBooks With Indexes that Reorganize Conceptually," Paper presented at Human Factors in Computing Systems Conference Apr. 24-29, 2004, Vienna, Austria.

G. W. Furnas, "Generalized Fisheye Views," Paper presented at the Conference on Human Factors in Computing Systems, 1986, Boston, Massachusetts.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm—Unofficial FAQ," SeoPedia, www.secopedia.org/tips-tricks/social-media/the-digg-algorithm-unofficial-faq, Nov. 2, 2006.

N. Patel, "There's More to Digg Than Meets the Eye," Pronet Advertising, www.pronetadvertising.com/articles/theres-more-to-digg-than-meets-the-eye.html, Jan. 15, 2007.

J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006.

J. Dowdell, "Digg Algorithm for Scoring Stories," Marketing Shift, www.marketingshift.com/2006/9/diggs-algorithm-elements-confirmed.cfm, Sep. 8, 2006.

P. Lenssen, "How Google News Indexes". See http://blogoscoped.com/archive/2006-07-28-n49.html, 2006.

A. Agarval, "How Google News works". http://labnol.blogspot.com/2005/05/how-google-news-works.html, 2005.

M. Helft, "How a Series of Mistakes Hurt Shares of United". New York Times. http://www.nytimes.com/2008/09/15/technology/15google.html?_r=1, 2008.

C. Holahan, "So Many Ads, So Few Clicks," BusinessWeek, p. 38 (Nov. 12, 2007).

Rocha L. M., "Adaptive Webs for Heterarchies With Diverse Communities of Users," Workshop From Intelligent Networks to the Global Brain: Evolutionary Technology, pp. 1-35 (Jul. 3, 2001).

Arasu et al., "Searching The Web," ACM, New York, NY, US, pp. 2-43 (Aug. 1, 2001).

G. A. Miller, "The Magical Number Seven, Plus or Minus Two: Some Limits on Our Capacity for Processing Information," Psychological Review, vol. 63, pp. 81-97, 1956.

* cited by examiner

Vanilla Monitor - localhost:8684

File Edit

| Overview | Collector | Hadoop | Trainer | Modeler | Searcher | Ranker | Tuner |

Topic Trainer - 2008 presidential election (1) / default (1) / housing crisis (7)

Community: 2008 presidential election     Index: default

Topic Browser
- economy (9)
  - bankruptcy (106)
  - federal budget (124)
  - gas prices (6)
  - housing crisis (7)

Train Topic | Saved Results: Pattern: (mortgag (hous crisi)) (Matches 191) Training Key Words: mortgag hous crisi   Article: Test   100

Training Input: (Community Articles 7861 / 500) (Topic Examples (Positive 5) (Negative 2))

[Topic housing crisis] Training times (msecs): [Reading: 61798] [Word counting: 2093] [Generating: 531]
Candidate Patterns (Score Upper Bound: 517, Count: 40) Cand Eval: 47 msecs  Tie Breaking: 234 msecs

| Candidate Pattern | Score | % Top Score | Boost Factor | # Articles | # Matches | # in Pos Ex | Pos Ex | Missed | Extra |
|---|---|---|---|---|---|---|---|---|---|
| (mortgag (hous crisi)) | 511 | | | | 191 | | | | |
| (price (hous bill)) | 506 | | | 2 | 1 | 2 | 5 | 0 | 0 |
| (crisi mortgag) | 505 | | | 2 | 1 | 2 | 5 | 0 | 0 |
| (mortgag dollar) | 500 | | | 2 | 1 | 2 | 5 | 0 | 0 |
| (mortgag price) | 500 | | | 2 | 1 | 2 | 5 | 0 | 0 |
| (dodd price) | 500 | | | 4 | 1 | 4 | 5 | 0 | 0 |
| (drawbaugh price) | 500 | | | 2 | 1 | 2 | 5 | 0 | 0 |
| (elect mortgag) | 500 | | | | | | | | |
| (economi mortgag) | 500 | | | | | | | | |

Basis Words (30 / 839) Upper Bound: 515  16 msecs

| Gen | Word | Score | % Top Score | | | | # in Base | Pos Ex Freq | Base Freq |
|---|---|---|---|---|---|---|---|---|---|
| S | nami | 3,292.492 | 100 | | | | 2 | 0.001 | 4.520602E-7 |
| SP | cartright | 3,292.492 | 100 | | | | 2 | 0.001 | 4.520602E-7 |
| S | khosraw | 3,292.494 | 100 | | | | 2 | 0.001 | 4.520602E-7 |
| S | boyl | 2,917.77 | 88.889 | | | | 9 | 0.001 | 2.048272E-6 |
| S | escrow | 2,188.328 | 66.667 | | | | 3 | 0.001 | 6.828906E-7 |

Established DB connection metta.parc.xerox.com 3306

SYSTEM AND METHOD FOR PROVIDING ROBUST TOPIC IDENTIFICATION IN SOCIAL INDEXES

CROSS-REFERENCE TO RELATED APPLICATION

This non-provisional patent application claims priority under 35 U.S.C§119(e) to U.S. provisional Patent Application Ser. No. 61/115,024, filed Nov. 14, 2008, the disclosure of which is incorporated by reference.

FIELD

This application relates in general to digital information organization and, in particular, to a system and method for providing robust topic identification in social indexes.

BACKGROUND

The Worldwide Web ("Web") is an open-ended digital information repository into which new information is continually posted and read. The information on the Web can, and often does, originate from diverse sources, including authors, editors, bloggers, collaborators, and outside contributors commenting, for instance, through a Web log, or "blog." Such diversity suggests a potentially expansive topical index, which, like the underlying information, continuously grows and changes.

Topically organizing an open-ended information source, like the Web, can facilitate information discovery and retrieval, such as described in commonly-assigned U.S. patent application, entitled "System and Method for Performing Discovery of Digital information in a Subject Area," Ser. No. 12/190,552, filed Aug. 12, 2008, pending, the disclosure of which is incorporated by reference. Books have long been organized with topical indexes. However, constraints on codex form limit the size and page counts of books, and hence index sizes. In contrast, Web materials lack physical bounds and can require more extensive topical organization to accommodate the full breadth of subject matter covered.

The lack of topical organization makes effective searching of open-ended information repositories, like the Web, difficult. A user may be unfamiliar with the subject matter being searched, or could be unaware of the extent of the information available. Even when knowledgeable, a user may be unable to properly describe the information desired, or might: stumble over problematic variations in terminology or vocabulary. Moreover, search results alone often lack much-needed topical signposts, yet even when topically organized, only part of a full index of all Web topics may be germane to a given subject.

One approach to providing topical indexes uses finite state patterns to form an evergreen index built through social indexing, such as described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference. Social indexing applies supervised machine learning to bootstrap training material into fine-grained topic models for each topic in the evergreen index. Once trained, the evergreen index can be used for index extrapolation to automatically categorize incoming content into topics for pre-selected subject areas.

Fine-grained social indexing systems use high-resolution topic models that precisely describe when articles are "On topic." However, the same techniques that make such models "fine-grained," also render the models sensitive to non-responsive "noise" words that can appear on Web pages as advertising, side-links, commentary, or other content that has been added, often after-the-fact to, and which take away from, the core article. As well, recognizing articles that are good candidates for broadening a topic definition can be problematic using fine-grained topic models alone. The problem can arise when a fine-grained topic model is trained too narrowly and is unable to find articles that are near to, but not exactly on the same topic as, the fine-grained topic.

Therefore, a need remains for providing topical organization to a corpus that facilitates topic definition with the precision of a fine-grained topic model, yet resilience to word noise and over-training.

SUMMARY

A system and method for providing robust topic identification in social indexes is provided. Fine-grained topic model, such as finite-state models, are combined with complementary coarse-grained topic models, such as characteristic word models.

One embodiment provides a computer-implemented method for providing robust topic identification in social indexes. Electronically-stored articles and one or more indexes are maintained. Each index includes topics that each relate to one or more of the articles. A random sampling and a selective sampling of the articles are both selected. For each topic, characteristic words included in the articles in each of the random sampling and the selective sampling are identified. Frequencies of occurrence of the characteristic words in each of the random sampling and the selective sampling are determined. A ratio of the frequencies of occurrence for the characteristic words included in the random sampling and the selective sampling is identified. Finally, for each topic, a coarse-grained topic model is built, which includes the Characteristic words included in the articles relating to the topic and scores assigned to those characteristic words.

Combining fine-grained and coarse-grained topic models enables automatic identification of noise pages, proposal of articles as candidates for near-misses to broaden a topic with positive training examples, and proposal of articles as candidates for negative training examples to narrow a topic with negative training, examples.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a diagram showing, by way of example, a set of generated finite-state patterns in a social index created by the social indexing system of FIG. 1.

FIG. 9 is a diagram showing, by way of example, a screen shot of a user interface that provides topic distance scores for identifying candidate near-miss articles.

FIG. 10 is a diagram showing, by way of example, a screen shot of an article that is a candidate "near-miss" article.

FIG. 13 is a diagram showing, by way of example, a set of generated finite-state patterns in a social index resulting from further retraining.

DETAILED DESCRIPTION

Glossary

Figure 1:
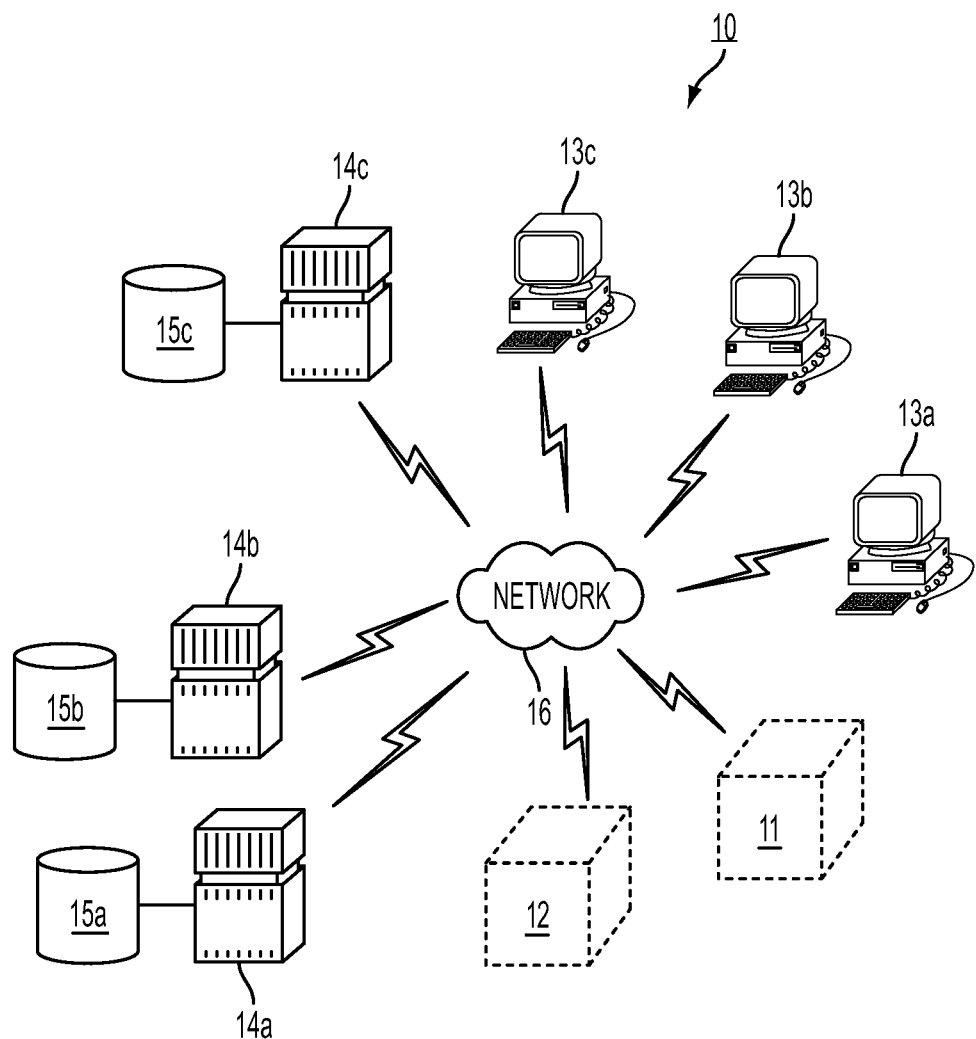
FIG. 1 is a block diagram showing an exemplary environment for digital information sensemaking.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent.

Topic: A single entry within a social index. In an evergreen index, a topic is accompanied by a fine-grained topic model, such as a pattern, that is used to match documents within a corpus. A topic may also be accompanied by a coarse-grained topic model.

Subtopic: A single entry hierarchically listed under a topic within a social index. In an evergreen index, a subtopic is also accompanied by a fine-grained topic model.

Fine-grained topic model: This topic model is based on brute state computing and is used to determine whether an article hills under a particular topic. Each saved fine-grained topic model is a finite-state pattern, similar to a query. This topic model is created by training a finite state machine against positive and negative training examples.

Coarse-grained topic model: This topic model is based on characteristic words and is used in deciding which topics correspond to a query. Each saved coarse-grained topic model is a set of characteristic words, which are important to a topic, and a score indicating the importance of each characteristic word. This topic model is also created from positive training examples, plus a baseline sample of articles on all topics in an index. The baseline sample establishes baseline word frequencies. The frequencies of words in the positive training examples are compared with the frequencies in the baseline samples, in addition to use in generating topical sub-indexes, coarse-grained models can be used for advertisement targeting, noisy article detection, near-miss detection, and other purposes.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that: continually remains current with the corpus. In an exemplar implementation, the social indexing system polls RSS feeds or crawl web sites to identify new documents for the corpus.

Social Indexing System: An online information exchange employing a social index. The system may facilitate information exchange among augmented communities, provide status indicators, and enable the passing of documents of interest from one augmented community to another. An interconnected set of augmented communities form is social network of communities.

Information Diet. An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Information Sensemaking and Retrieval Environment

Digital information sensemaking and retrieval are related, but separate activities. The former relates to sensemaking mediated by a digital information infrastructure, which includes public data networks, such as the Internet, standalone computer systems, and open-ended repositories of digital information. The latter relates to the searching and mining of information from a digital information infrastructure, which may be topically organized through social indexing, or by other indexing source. FIG. 1 is a block diagram showing an exemplary environment 10 for digital information sensemaking and information retrieval. A social indexing system 11 and a topical search system 12 work in tandem to respectively support sensemaking and retrieval, the labors of which can, in turn, be used by information producers, such as bloggers, and information seekers, that: is, end users, through widgets that execute on a Web browser.

In general, digital information is a corpus of information available in digital form. The extent of the information is open-ended, which implies that the corpus and its topical scope grow continually and without fixed bounds on either size or subject matter. A digital data communications network 16, such as the Internet, provides an infrastructure for provisioning, exchange, and consumption of the digital information. Other network infrastructures are also possible, for instance, a non-public corporate enterprise network. The network 16 provides interconnectivity to diverse and distributed information sources and consumers, such as between the four bodies of stakeholders, described supra, that respectively populate and, access the corpus with articles and other content. Bloggers, authors, editors, collaborators, and outside contributors continually post blog entries, articles, Web pages, and the like to the network 16, which are maintained as a distributed data corpus through Web servers 14a, news aggregator servers 14b, news servers with voting 14c, and other information sources. These sources respectively serve Web content 15a, news content 15b, community-voted or "vetted" content 15c, and other information to users that access the network 16 through user devices 13a-c, such as personal computers, as well as other servers. For clarity, only user devices will be mentioned, although servers and other non-user device information consumers may similarly search, retrieve, and use the information maintained in the corpus.

In general, each user device 13a-c is a Web-enabled device that executes a Web browser or similar application, which supports interfacing to and information exchange and retrieval with the servers 14a-c. Both the user devices 13a-c and servers 14a-c include components conventionally found in general purpose programmable computing devices, such as a central processing unit, memory, input/output ports, network interfaces, and non-volatile storage. Other components are possible. As well, other information sources in lieu of or in addition to the servers 14a-c, and other information consumers, in lieu of or in addition to user devices 13a-c, are possible.

Digital sensemaking is facilitated by a social indexing system 11, which is also interconnected to the information sources and the information consumers via the network 16. The social indexing system 11 facilitates the automated discovery and categorization of digital information into topics within the subject area of an augmented community.

Figure 2:
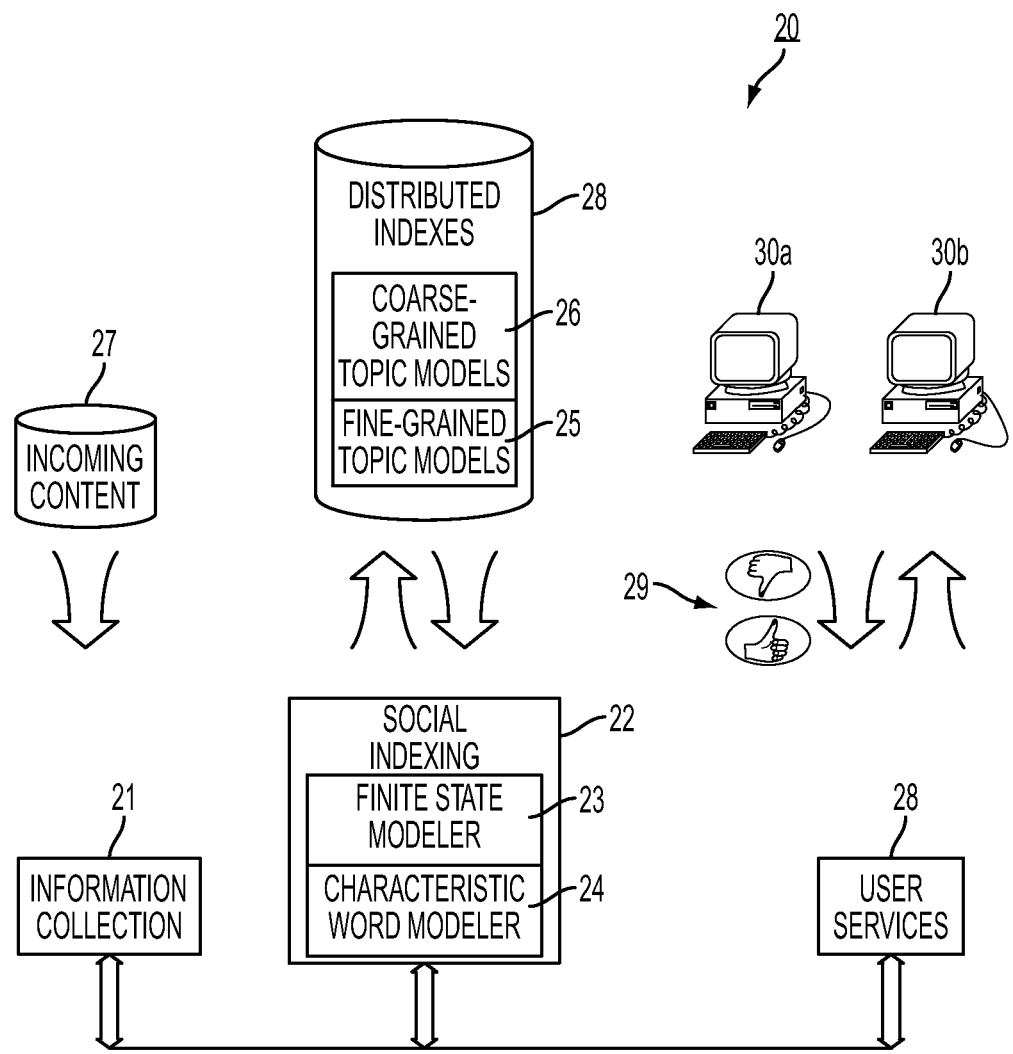
FIG. 2 is a functional block diagram showing principal components used in the environment of FIG. 1.

From a user's point of view, the environment 10 for digital information retrieval appears as a single information portal, but is actually it set of separate but integrated services. FIG. 2 is a functional block diagram showing principal components 20 used in the environment 10 of FIG. 1. The components are focused on digital information categorization and organization. Additional components may be required to provide other related digital information activities, such as discovery, prospecting, and orienting.

The components 20 can be loosely grouped into three primary functional modules, information collection 21, social indexing 22, and user services 28. Other functional modules are possible. Additionally, the functional modules can be implemented on the some or separate computational platform. Information collection 21 obtains incoming content 27, from the open-ended information sources, which collectively form a distributed corpus of electronically-stored information. The incoming content 27 is collected by a media collector to harvest new digital information from the corpus. The incoming content 27 can typically be stored in a structured repository, or indirectly stored by saving hyperlinks or citations to the incoming content in lieu of maintaining actual copies.

The incoming content 27 is collected as new digital information based on the collection schedule. New digital information could also be harvested on demand, or based on some other collection criteria. The incoming content 27 can be stored in a structured repository or database (not shown), or indirectly stored by saving hyperlinks or citations to the incoming content 27 in lieu of maintaining actual copies. Additionally, the incoming content 27 can include multiple representations, which differ from the representations in which the digital information was originally stored. Different representations could be used to facilitate displaying titles, presenting article summaries, keeping track of topical classifications, and deriving and using fine-grained topic models, such as described in commonly-assigned U.S. patent application, entitled "System and Method for Performing Discovery of Digital Information in a Subject Area," Ser. No. 12/190,552, filed Aug. 12, 2008, pending, the disclosure of Which is incorporated by reference, or coarse-grained topic models, such as described in commonly-assigned U.S. patent application, entitled "System and Method for Providing a Topic-Directed. Search," Ser. No. 12/354,681, filed Jan. 15, 2009, pending, the disclosure of which is incorporated by reference. Words in the articles could also be stemmed and saved in tokenized form, minus punctuation, capitalization, and so forth. The fine-grained topic models created by the social indexing system 11 represent fairly abstract versions of the incoming content 27, where many of the words are discarded and word frequencies are mainly kept.

The incoming content 27 is preferably organized through social indexing under at least one topical or "evergreen" social index, which may be part of a larger set of distributed topical indexes 28 that covers all or most of the information in the corpus. In one embodiment, each evergreen index is built through a finite state modeler 23, which forms the core of a social indexing system 22, such as described in commonly-assigned. U.S. patent application, Ser. No. 12/190,552, Id. The evergreen index contains fine-grained topic models 25, such as finite state patterns, which can be used to test whether new incoming content 27 falls under one or more of the index's topics. Each evergreen index belongs to an augmented social community of on-topic and like-minded users. The social indexing system applies supervised machine learning to bootstrap training material into the fine-grained topic models for each topic and subtopic. Once trained, the evergreen index can be used for index extrapolation to automatically categorize new information under the topics for pre-selected subject areas.

The fine-grained topic models 25 are complimented by coarse-grained topic models 26, also known as characteristic, word topic models, that can each be generated by a characteristic word modeler 24 in a social indexing system 22 for each topic in the topical index. The coarse-grained topic models 26 are used to provide an estimate for the topic distance of an article from the center of a topic, as further described below beginning with reference to FIG. 3.

Finally, user services 28 provide a front-end to users 30a-b to access the distributed indexes 28 and the incoming content 27. In a still further embodiment each topical index is tied to a community of users, known as an "augmented" community, which has an ongoing interest in a core subject area. The community "vets" information cited by voting 29 within the topic to which the information has been assigned.

Robust Topic Identification

In the context of social indexes, topic models are computational models that characterize topics. Topic identification can be made more resilient and robust by combining fine-grained topic models with coarse-grained topic models.

Fine-Grained Topic Models

Fine-grained topic models 25 can be represented as finite-state patterns and can be used, for instance, in search queries, such as described in commonly-assigned U.S. patent application Ser. No. 12/354,681, Id. Often, these patterns will contain only a few words, but each pattern expresses specific and potentially complex relations. For example, the pattern "[(mortgage housing) crisis {improper loans}]" is a topic model expression, which can be used to identify articles that contain the word "crisis," either the word "mortgage" or the word "housing," and the two-word n-gram, that is, adjacent words, "improper loans."

Finite-state topic models are used to represent fine-grained topics. Finite state models are used with Boolean matching operations, wherein text will either match, or not match, a specified pattern. FIG. 3 is a diagram showing, by way of example, a set of generated finite-state patterns in a social index created by the social indexing system 11 of FIG. 1. The social index is called "Presidential Election." The topic in this example is "policy/issues/economy housing crisis." Thousands of patterns, or topic models, were generated using an example-based training program. The words have been stemmed, such that the stem-word "hous" matches "house," "houses," and "housing." Similarly, the stem-word "mortgag" matches "mortgage," "mortgages," and "mortgaging." The top pattern was "(mortgag {hous crisis})," which is a topic model that matches articles containing either the term "mortgag" or the n-gram "Eons crisis." A set of such finite state topic models can be associated with topics in an evergreen index.

Figure 4:
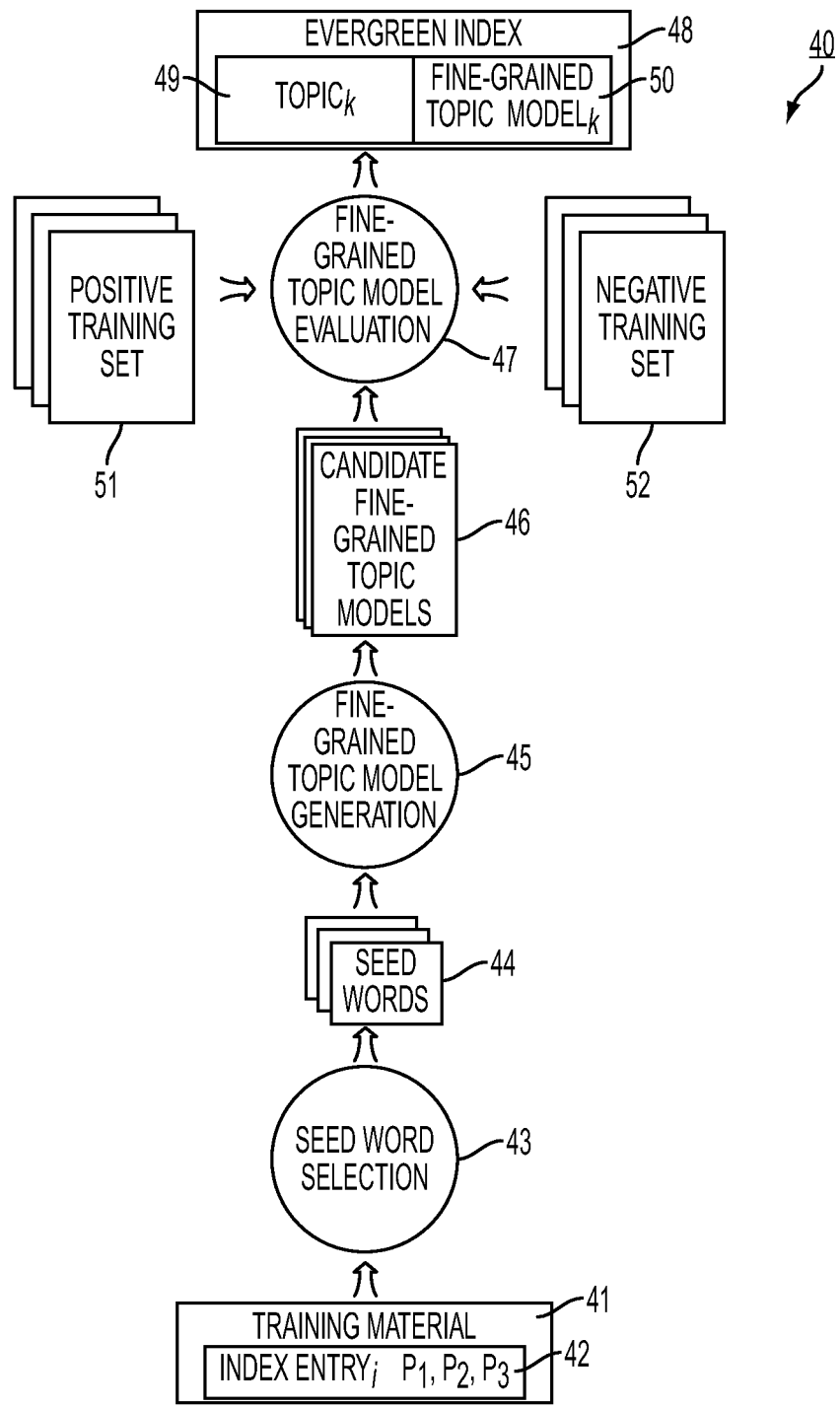
FIG. 4 is a data flow diagram showing fine-grained topic model generation.

The topic models can be created through supervised machine learning and applied to extrapolate the evergreen index. FIG. 4 is a data flow diagram showing fine-grained topic model generation 40, in brief, an evergreen index 48 is formed by pairing a topic or subtopic 49 with a fine-grained topic model 50, which is a form of finite state topic model. The evergreen index 48 can be trained by starting with a training index 41, which can be either a conventional index, such as for a book or hyperlinks to Web pages, or an existing evergreen index. Other sources of training indexes are possible.

For each index entry 42, seed words 44 are selected (operation 43) from the set of topics and subtopics in the training index 41. Candidate fine-grained topic models 46 patterns, are generated (operation 45) from the seed words 44. Fine-grained topic models can be specified as patterns, term vectors, or any other form of testable expression. The fine-grained topic models transform direct page citations, such as found in a conventional index, into an expression that can be used to test whether a text received as incoming content 27 is on topic.

Finally, the candidate fine-grained topic models 46 are evaluated (operation 47) against positive and negative training sets 51, 52. As the candidate fine-grained topic models 46 are generally generated in order of increasing complexity and decreasing probability, the best candidate fine-grained topic models 46 are usually generated first. Considerations of structural complexity are also helpful to avoid over-fitting in machine learning, especially when the training data are sparse.

The automatic categorization of incoming content 27 using, an evergreen index is as continual process. Hence, the index remains up-to-date and ever "green." The topic models 50 in an evergreen index 48 enable new and relevant content to be automatically categorized by topic 49 through index extrapolation. Moreover, unlike a conventional index, an evergreen index 48 contains fine-grained topic models 49 instead of citations, which enables the evergreen index 48 to function as a dynamic structure that is both untied to specific content while remaining applicable over any content. New pages, articles, or other forms of documents or digital information are identified, either automatically, such as through a Web crawler, or manually by the augmented community or others. Pages of incoming documents are matched against the fine-grained topic models 50 of an evergreen index 48 to determine the best fitting topics or subtopics 49, which are contained on those pages. However, the fine-grained topic models 50 have their limits. Not every document will be correctly matched to a fine-grained topic model 50. As well, some information in the documents may be wrongly matched, while other information may not be matched at all, yet still be worthy of addition to the evergreen index 48 as a new topic or subtopic 49.

Coarse-Grained Topic Models

Figure 5:
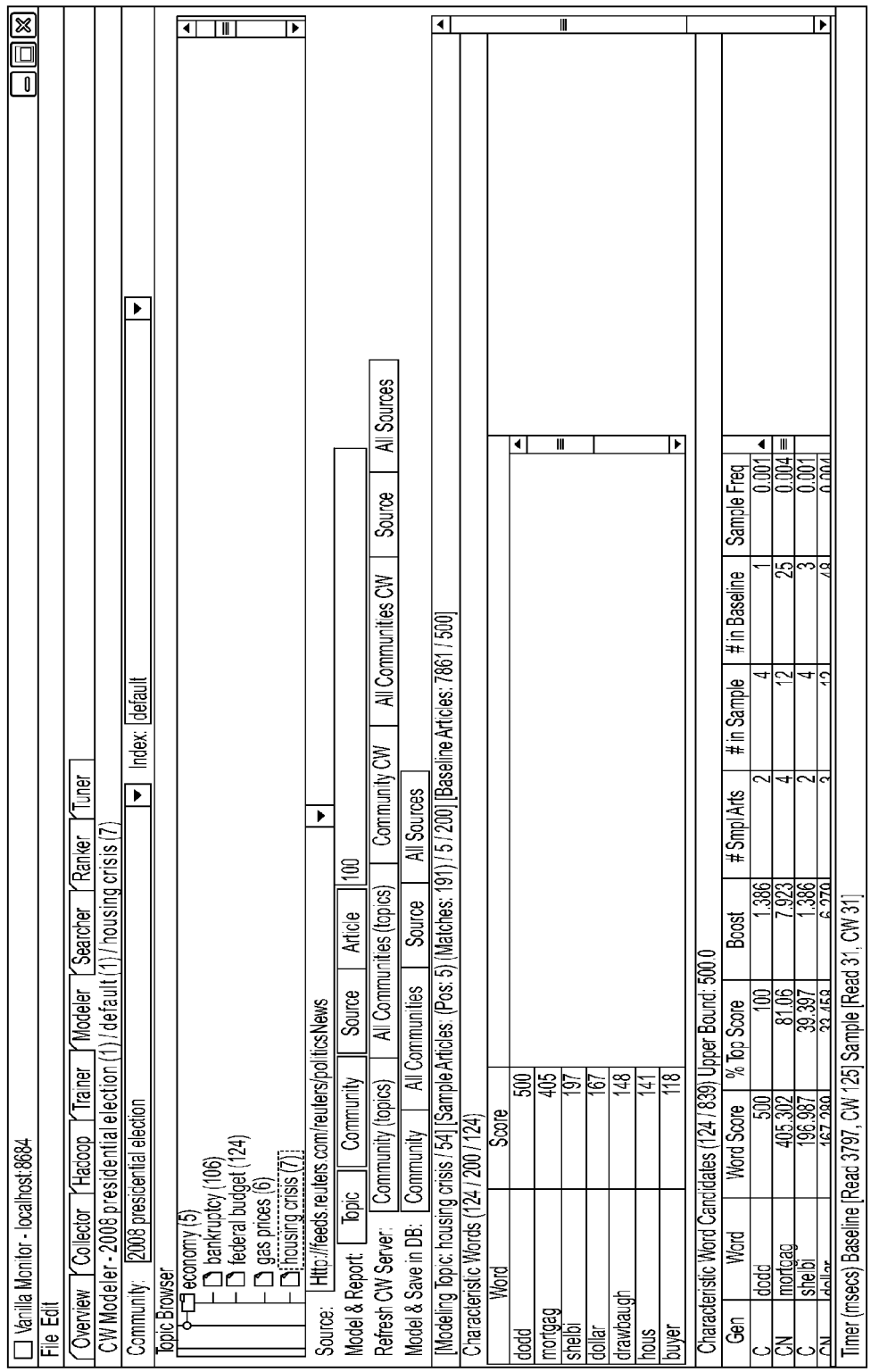
FIG. 5 is a diagram showing, by way of example, a characteristic word model created by the social indexing system of FIG. 1.

Coarse-grained, or characteristic word, topic models 26 are statistically-based word population profiles that are represented as arrays of words and weights, although other data structures could be used instead of arrays. In social indexing, the weights typically assigned to each word are frequency ratios, for instance, ratios of term frequency-inverse document frequency (TF-IDF) weighting, that have been numerically boosted or deemphasized in various ways. FIG. 5 is a diagram showing, by way of example, a characteristic word model created by the social indexing system 11 of FIG. 1. In the example, characteristic words for the topic "housing crisis" are listed. The word "dodd" has been assigned a weight of 500, the word "mortgage," stemmed as described supra, has been assigned a weight of 405, and so forth for the remaining words, including "hours," "buyer," "crisi," "price," "loan," "rescue," "inflat," "estat," "market" and "rescue," Related topics have related sets of characteristic words. For example, the characteristic words for the topic "bankruptcy" strongly overlaps the characteristic words identified for the topic "housing crisis."

Figure 6:
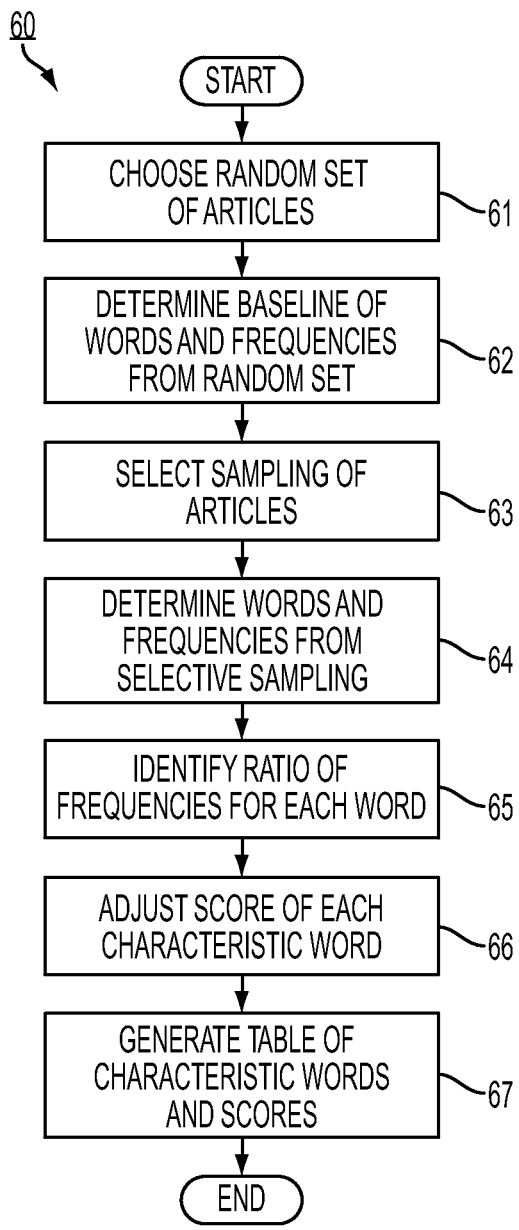
FIG. 6 is a data flow diagram showing coarse-grained topic model generation.

Each coarse-grained topic model contains characteristic words and a score that reflects the relative importance of each characteristic, word. A characteristic word model can contain hundreds or even thousands of words and their associated weights. FIG. 6 is a data flow diagram showing coarse-grained topic model generation 60. Characteristic words are useful in discriminating text about a topic without making false positive matches, where a fine-grained topic model matches noise content on a page, or false negative matches, where it fine-grained topic model does not match the page. Characteristic words are typically words selected from the articles in the corpus, which include Web pages, electronic books, or other digital information available as printed material.

Initially, a set of articles is randomly selected out of the corpus (step 61). A baseline of characteristic words is extracted from the random set of articles and the frequency of occurrence of each characteristic word in the baseline is determined (step 62). To reduce latency, the frequencies of occurrence of each characteristic word in the baseline can be pre-computed. In one embodiment, the number of articles appearing under the topics in an index is monitored, such as on an hourly basis. Periodically, when the number of articles has changed by a predetermined amount, such as ten percent, the frequencies of occurrence are re-determined. A selective sampling of the articles is selected out of the corpus, which are generally a set of positive training examples (step 63). In one embodiment, the positive training examples are the same set of articles used during supervised learning when building fine-grained topic models, described supra. In a further embodiment, a sampling of the articles that match fine-grained topic models could be used in lieu of the positive training examples. Characteristic words are extracted from the selective sampling of articles and the frequency of occurrence of each characteristic word in the selective sampling of articles is determined (step 64). A measure or score is assigned to each characteristic word using, for instance, term frequency-inverse document frequency (TF-IDF) weighting, which identifies the ratio of frequency of occurrence of each characteristic word in the selective sampling of articles to the frequency of occurrence of each characteristic word in the baseline (step 65). The score of each characteristic word can be adjusted (step 66) to enhance, that is, boost, or to discount, that is, deemphasize, the importance of the characteristic word to the topic. Finally, a table of the characteristic words and their scores is generated (step 67) for use in the query processing stage. The table can be a sorted or hashed listing of the characteristic words and their scores. Other types of tables are possible.

The score of each characteristic word reflects a raw ratio of frequencies of occurrence and each characteristic word score can be heuristically adjusted in several ways, depending upon context to boost or deemphasized the word's influence. For instance, the scores of singleton words, that is, words that appear only once in the corpus or in the set of cited materials, can by suppressed or reduced by, for example, 25 percent, to discount their characterizing influence. Similarly, the scores of words with a length of four characters or less can also be suppressed by 25 percent, as short words are not likely to have high topical significance. Other percentile reductions could be applied. Conversely, words that appear in labels or in titles often reflect strong topicality, thus all label or title words are included as characteristic words. Label and title word scores can be boosted or increased by the number of times that those words appear in the corpus or sample material. Lastly, the scores of words appearing adjacent to or neighboring label or title words, and "proximal" words appearing around label or title words within a fixed number of words that define a sliding "window" are boosted. Normalized thresholds are applied during neighboring and proximal word selection. Default thresholds of eight and fifteen words are respectively applied to neighboring and proximal words with a set window size of eight words. Other representative thresholds and window sizes can be used. Finally, the scores of the characteristic words are normalized. The characteristic word having the highest score is also the most unique word and the score of that word is set to 100 percent. For instance, in the example illustrated in FIG. 5, scores are normalized to a value of 500. The scores of the remaining characteristic words are scaled based on the highest score. Thus, upon the completion of characteristic word selection, each topic in the index has a coarse-grained topic model, which has been expressed in terms of characteristic words that each have a corresponding score that has been normalized over the materials sampled from the corpus.

Detecting Articles with Misleading Noise

There are many variations in how information is brought together on a Web page. Page display languages, like the Hypertext Markup Language (HTML), describe only the layout of a Web page, but not: the logical relationship among groups of words on the Web page. As well, the Web pages for an article on a particular topic can sometimes contain a substantial amount of other extraneous information that detracts from the article itself. For example, a Web page with a news article may include advertisements, hyperlinks to other stories, or comments by readers, which may be off-topic and irrelevant.

Figure 7:
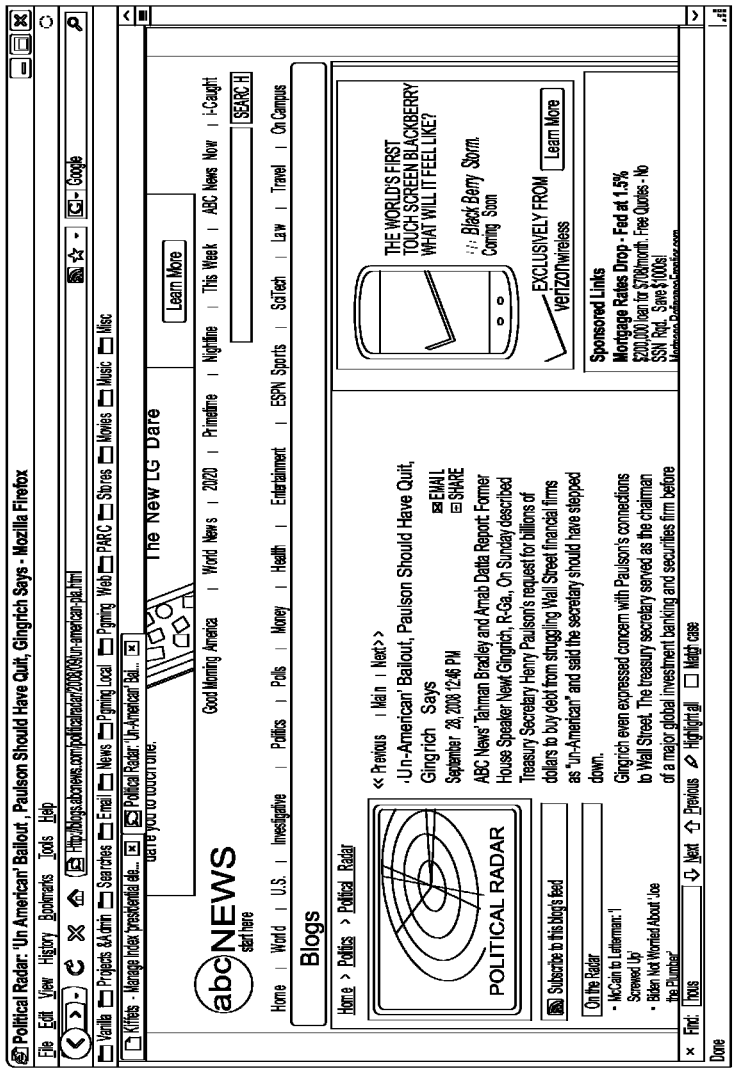
FIG. 7 is a diagram showing, by way of example, a screen shot of a Web page in which a fine-grained topic model erroneously matches noise.

Such extraneous content constitutes information "noise." FIG. 7 is a diagram showing, by way of example, a screen shot of a Web page in which a fine-grained topic model erroneously matches noise. The Web page contains noise words from content that match different fine-grained topic models, which have been generated for the topic "housing crisis." For example, the "On the Radar" column on the left side of the Web page includes an article entitled, "McCain to Letterman: Screwed Up." In addition, several reader comments (not shown) appear below the body of the article and include the terms "loan" and "mortgage." For example, one reader comments, "All for only less than 5% of the mortgages in this country that have went had [sic]. Sad that they won't tell America the truth. 95% of American's are paying their home loans on time, yet we are about to go into major debt for only 5% of bad loans made to investors who let their loans go, spectators who wanted a quick buck, the greedy who wanted more than they could afford and the few who should have never bought in the first place."

In this example, a coarse-grained topic model was ranked against "positive training examples" or "articles like this" in a topic training interface for a social indexing system, described infra. A normalized topic distance score was computed for articles ranging from 100%, which represented articles that were on-topic, to 0%, for those articles that were off-topic. In general, pages with scores less than 10%-15% corresponded to noise pages. Under this analysis, the normalized topic distance score for the article described with reference to FIG. 7 was less than 5%, which is off-topic.

Combining Fine-Grained and Coarse-Grained Topic Models

In an example-based approach to training for social indexes, an index manager can provides positive examples ("more like this example") and negative examples ("not like this example") that the system can use to guide classification of articles. Fine-grained topic models are created using both positive and negative training examples. For each fine-grained topic model, the social indexing system generates patterns that match the positive examples and that do not match the negative examples. In contrast, coarse-grained topic models may be created using only positive training examples. For each coarse-grained topic model, the social indexing, system creates a term vector characterizing the populations of characteristic words found in the training examples. Coarse-grained models that make use of negative training examples may also be created. For example, in models for the topic "Mustang," the positive examples could describe articles about horses and the negative examples could describe articles about a model of automobile sold by Ford Motor Company.

Figure 8:
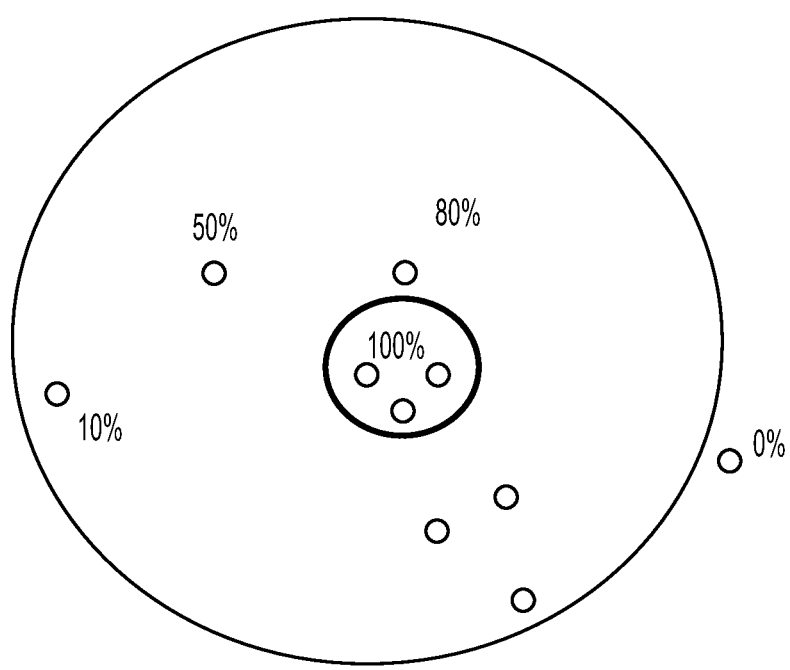
FIG. 8 is a diagram showing, by way of example, interaction of two hypothetical Web models.

A coarse-grained topic model is not as capable of making the detailed, fine-grained topical distinctions as a fine-grained topic model, in part because the coarse-grained topic model does not use information from negative training examples. As well, the term vector representation does not encode specific relationships among the words that appear in the text. In practice, though, topics that are topically near each other can have similar lists of words and weights. FIG. 8 is a diagram showing, by way of example, interaction of two hypothetical Web models. The blue circle contains articles that match a fine-grained topic filter. Articles within the red circle have positive scores as characterized under a coarse-grained topic model; however, scores lower than 10% usually indicate that an article is a "noise" off-topic article. The articles with bib scores that are outside the blue circle are good candidates as "near-misses," which are articles that may be good candidates for adding to the set of positive training examples to broaden the topic.

Scores can be computed for a coarse-grained topic model in several ways. One approach is described supra with reference to FIG. 6, which assigns a measure or score assigned to each characteristic word using, for instance, TF-IDF weightings, that can be boosted or reduced. Another approach starts by identifying the set of words in the article that are also in the topic model. A raw score can be defined as the sum of the weights in the topic model for those words. The article with the highest score is found for all of the measured articles. This high score is set to correspond to 100% and the scores for the remaining articles are normalized against the high score. Still other approaches are possible.

Empirically, combining coarse-grained and fine-grained topic models gives better results than using either model alone. A fine-grained topic model is by itself a overly sensitive to noise words and susceptible to choosing off-topic content due to misleading noise. Since a coarse-grained topic model takes into account the full set of words in each article in its entirety, the model is inherently less sensitive to noise, even when the noise represents a small fraction of the words. In practice, a good approach has been to use the fine-grained topic model to identify articles as candidates for articles viewed to be precisely on-topic, and to use the coarse-grained topic model to weed out those articles that are misclassified due to noise.

In contrast, a coarse-grained topic model is by itself a blunt instrument. When topics are near each other, a fine-grained topic model can correctly distinguish those articles that are on-topic from those articles that are off-topic. In contrast, the scoring, of a coarse-grained topic model is not accurate enough to reliably make fine distinctions among topics and an article that is precisely on-topic could generate a lower score than an article that is off-topic, thereby fooling the coarse-grained topic model. For example, the same topical index, as described supra with reference to FIG. 5, was trained on articles reflecting the effect of "gasoline prices" on consumers. Using a coarse-grained metric alone, articles about the dropping of housing values in distant suburbs had scores around 80%. Articles about the issues of offshore oil drilling and their potential relation to future gas prices had scores of around 50%. Articles about ecological considerations of drilling for oil in the arctic had scores in the 25% range. The topic filter was trained with negative examples that tended to filter out the articles that were somewhat of T-topic, even though the overall word usage patterns were not highly distinguishable.

Guiding Tonic Training by Combining Topic Models

One of the challenges of training fine-grained topic models is in finding good training examples. If a social index uses even a dozen news feeds in a subject area, several thousand articles can be collected over a couple weeks. In one exemplary implementation, the system was pulling in about 18,000 articles per day across all indexes. Additionally, several broad indexes currently pull in hundreds or thousands of articles per day. The training process typically starts when a user initially examines a few articles and picks some of the articles to use as positive training examples. The social indexing system then looks for finite state topic models, such as patterns, that will match these articles. Unconstrained by negative training examples, the social indexing system looks tot simple patterns adequate for matching all of the articles in the positive training examples. This approach can result in representing the topic too broadly.

After seeing articles being matched by the social indexing system that are off-topic, the user adds some negative training examples. Again, the social indexing system generates patterns, but now with the requirement that the patterns match the positive examples ("more like this example") and not match the negative examples ("not like this example"). Consequently, the social indexing system returns fewer matches. Despite the additional training using negative examples, the user remains uncertain over when enough, or too many, articles have been discarded by the social indexing system.

Figure 9:
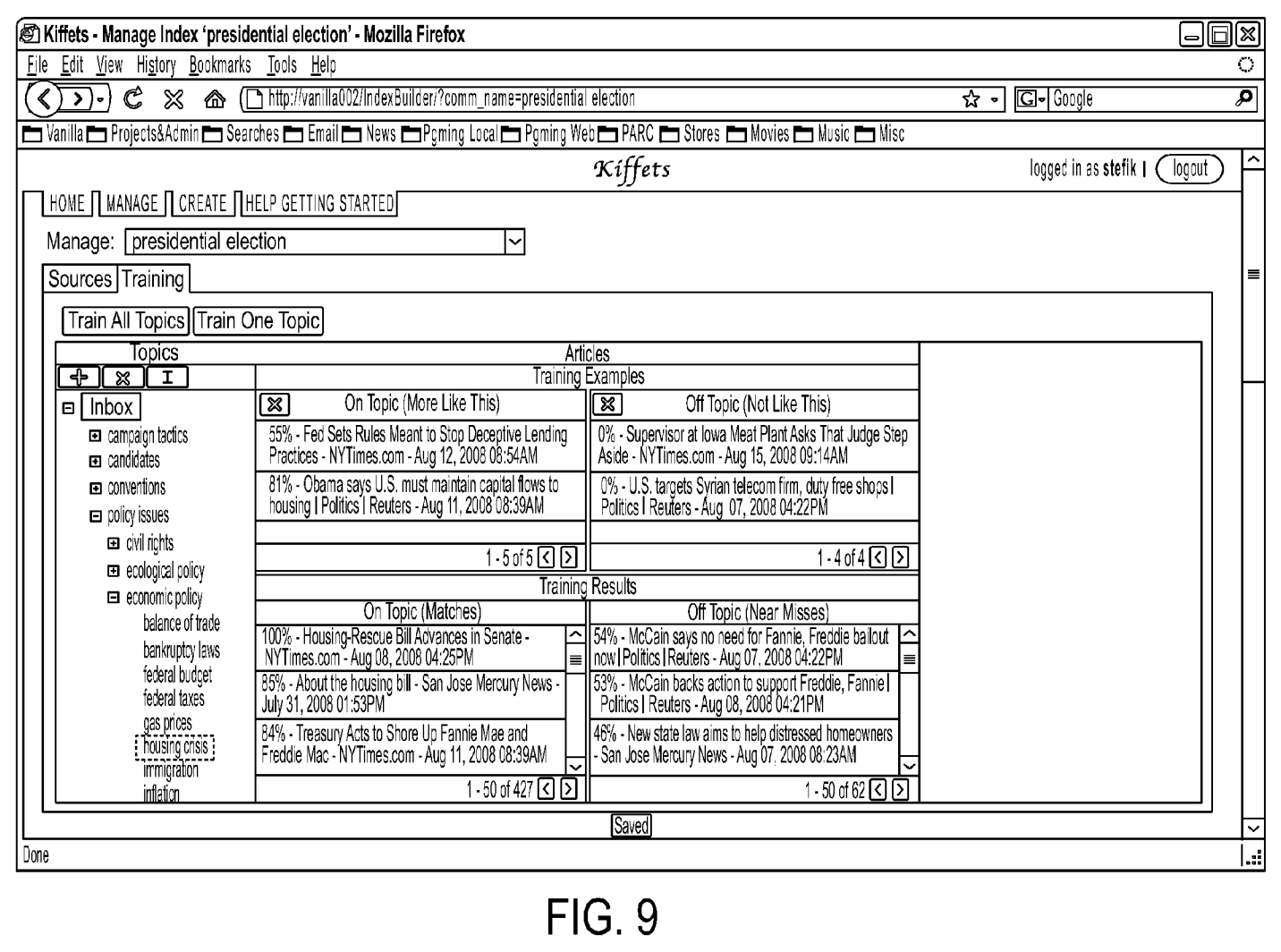

Furthermore, the training process becomes can quickly become tedious when there are thousands of articles, mostly wildly off-topic. Identifying "near-misses," that is, articles that are near a topic and that would make good candidates for broadening a topic definition, becomes difficult in light of an overabundance of articles, absent other guidance. FIG. 9 is a diagram showing, by way of example, a screen shot of a user interface that provides topic distance scores for identifying candidate near-miss articles. The user interface provides a set of positive and negative training examples in the upper left and upper right quadrants, respectively. The lower left quadrant provides articles that matched the fine-grained topic models. The lower right quadrant shows a list of articles that are candidate "near-misses." These articles do not match the current fine grained topic model, but nevertheless have high topical distance scores from the coarse-grained topic model. The candidate "near-miss" articles are sorted, so that the articles with the highest scores are displayed at the top of the list, although other ways to organize the articles are possible.

Figure 10:
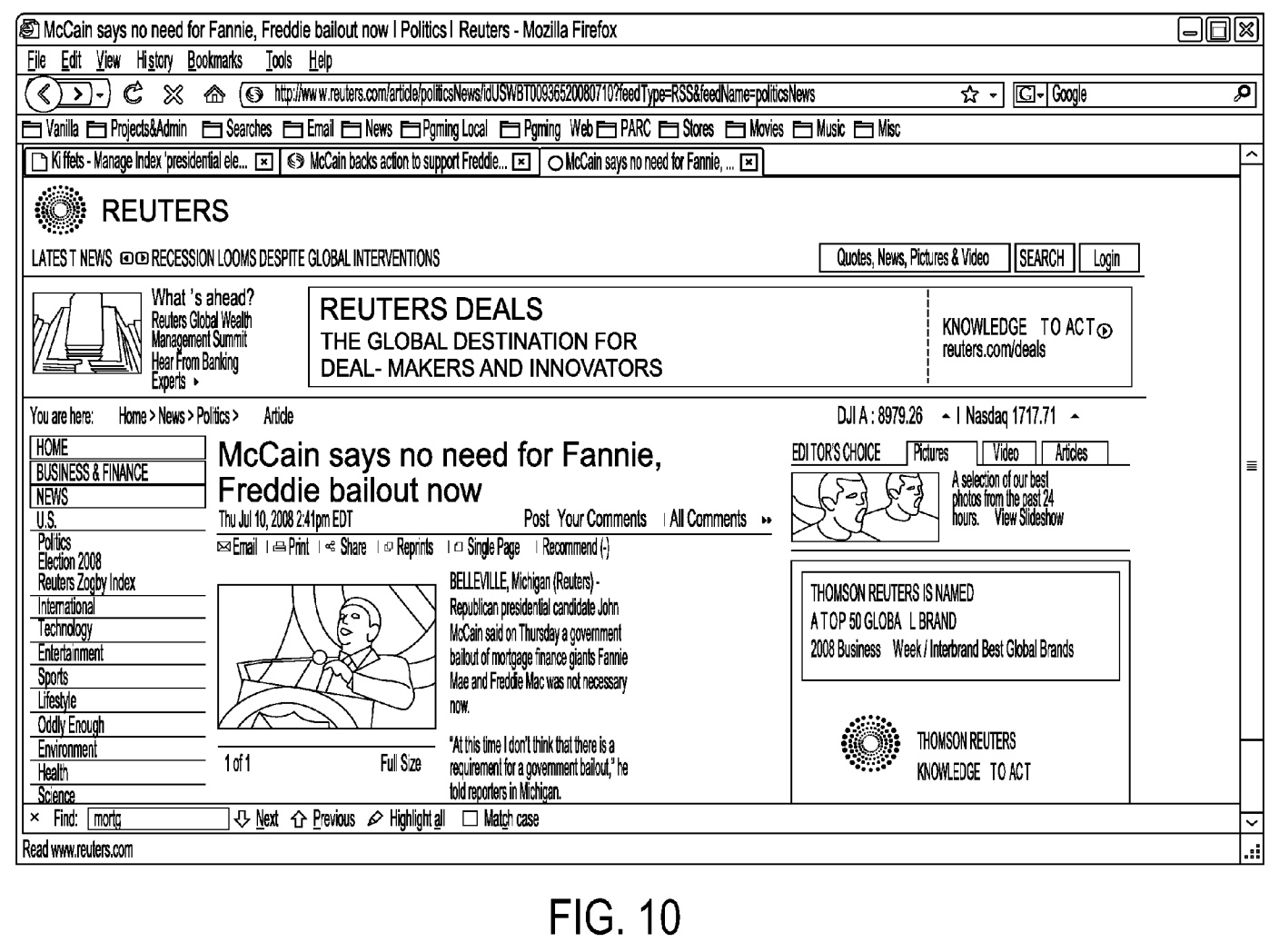
Figure 11:
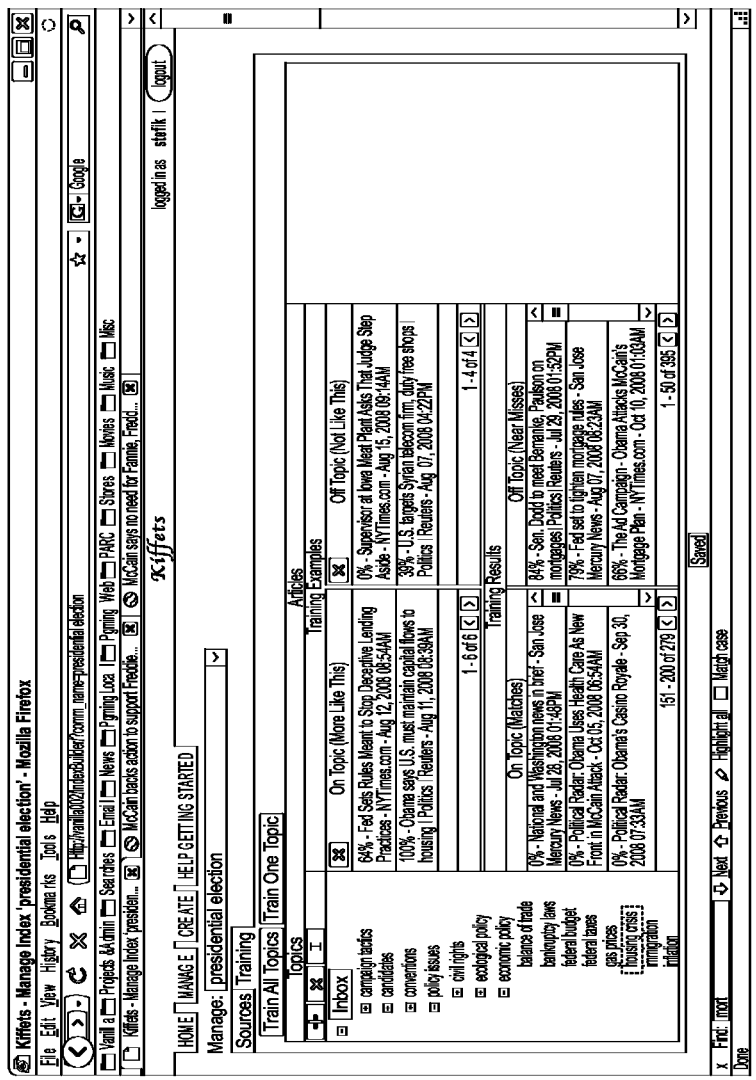
FIG. 11 is a diagram showing, by way of example, a screen shot of the user interface of FIG. 9 following retraining.

The list of candidate "near-miss" articles focuses the training manager's attention on topic breadth. Rather than having to manually search through thousands of articles, the training manager can instead inspect just the articles at the top of the list. In this example, an article entitled, "McCain sees no need for Fannie, Freddie bailout now," shown with reference to FIG. 10, has a high score of 54%. If the training manager thinks that this article should be included in the topic, he can add the article to the set of positive training examples in the upper left quadrant and retrain the fine-grained topic models. FIG. 11 is a diagram showing, by way of example, a screen shot of the user interface of FIG. 9 following retraining. Although the training, manager does not actually see the new fine-grained topic model patterns, the social indexing system has revised one of the underlying patterns to express, "(freddi {lend practice})," which matches all of the positive training examples and does not match any of the negative training examples.

For best results, training managers need to pick good representative articles as training examples. If a training manager picks noise articles as positive training examples, the social indexing system will receive a fallacious characterization of the topic, and the coarse-grained topic model generated will embody a misleading distribution of characteristic words. Conversely, if the training manager picks noise articles as negative training, examples, the social indexing system will generate fine-grained topic models that do not match articles for the topic. This option can cause inferior training of the fine-grained topic models, as the social indexing system generates patterns to work around the existing and potentially acceptable patterns that happen to match the noise in the negative training examples, which in turn can cause the social indexing system to rule out other good articles.

Figure 12:
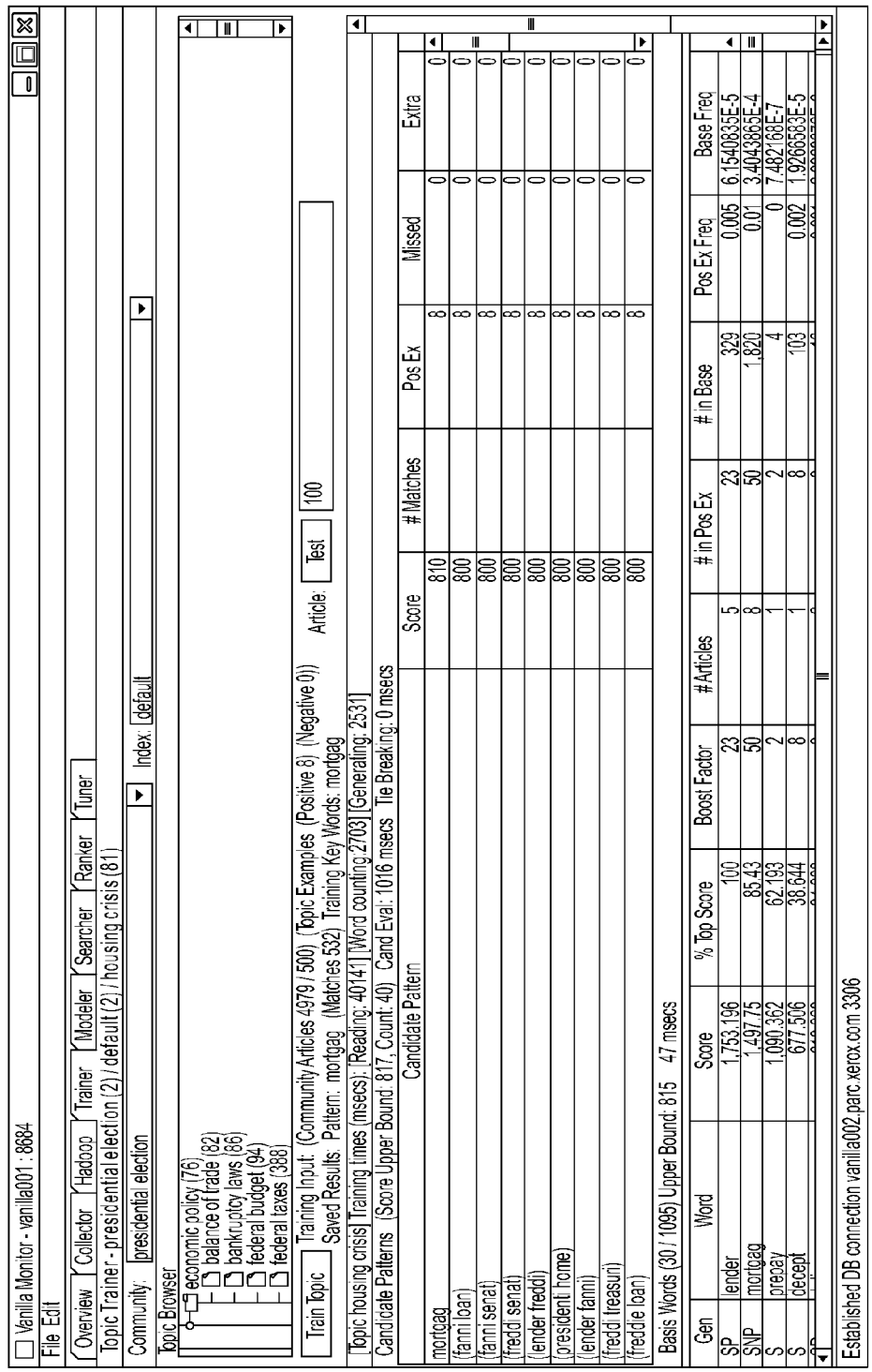
FIG. 12 is a diagram showing, by way of example, a complementary debugging display for the data in FIG. 11 following further retraining.

In the example described in FIG. 11, the training manger has used low scoring articles as negative training examples, which is a bad practice that can also be flagged by the social indexing system. Thereafter, the training manager can delete the low-scoring negative training examples and add instead positive training examples. FIG. 12 is a diagram Showing, by way of example, a complementary debugging display for the data in FIG. 11 following further retraining, which eliminated the low-scoring negative training examples. The display illustrated in FIG. 12 shows candidate patterns for the fine-grained topic model following retraining. On retraining, the social indexing system matched all of the positive training examples and generated the simple pattern "mortgage." The training manager can then examine the positive matches to see whether this generalized pattern resulted in retrieving articles that were off-topic.

Figure 13:
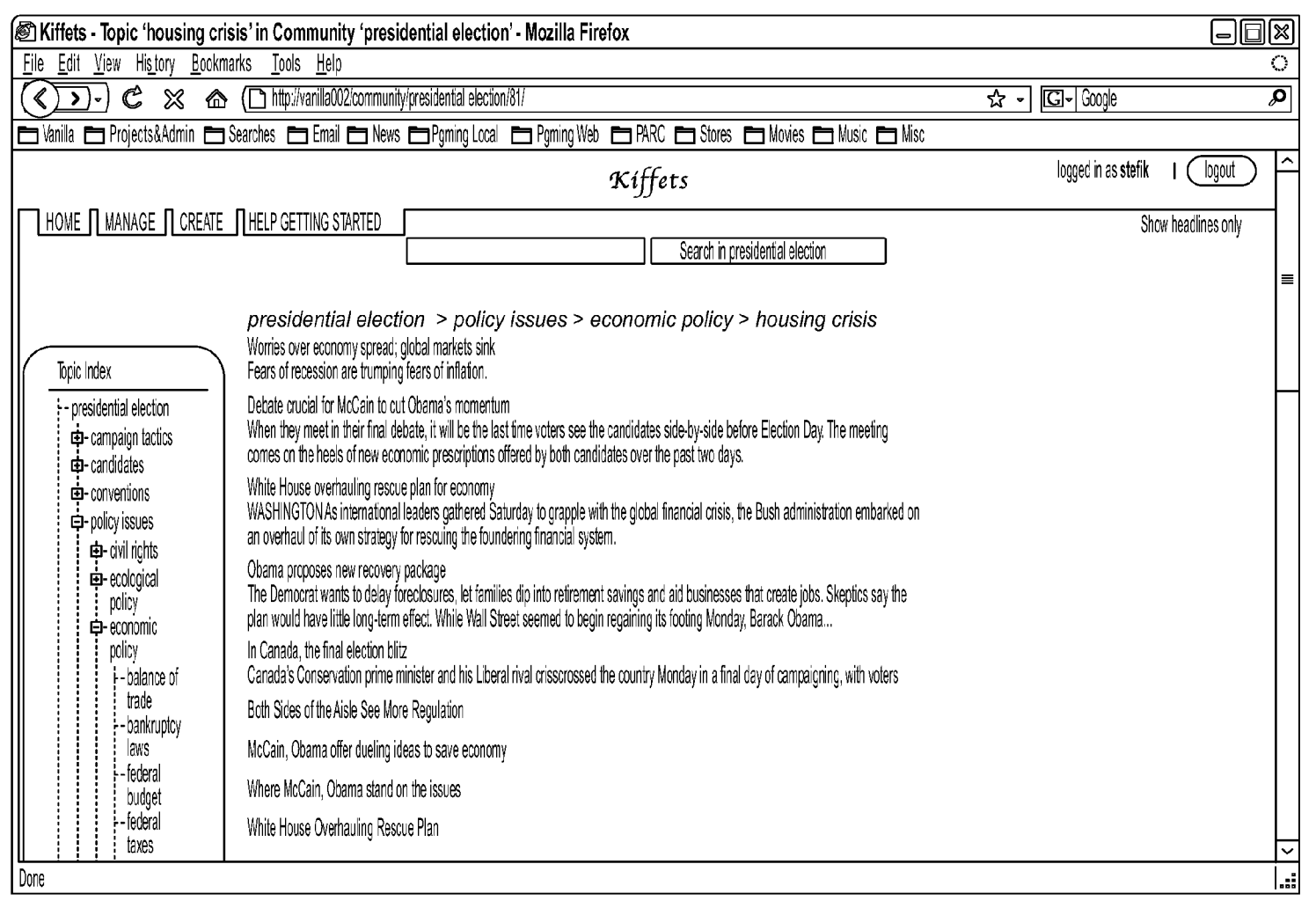

After training, a social index can support an evergreen process of classifying new articles. Articles can be collected from the Web, such as by using a Web crawler or from RSS feeds. The fine-grained topic models are used to identify articles that are precisely on topic, and the coarse-grained topic models are used to remove articles that were misclassified due to noise. FIG. 13 is a diagram showing, by way of example, a set of generated finite-state topic model patterns in a social index resulting from further retraining, which eliminated poor negative training examples automatically classified for the topic "housing crisis."

Identifying Candidate Negative Examples

False positive training examples are articles that are incorrectly classified as belonging to a topic. When these articles are being matched due to noise in the article, the noise-detection technique, described supra with reference to FIG. 9, is effective at identifying noise articles. Referring to TABLE 1, an outline of suggested trainer actions is provided, which are performed in response to training cases that can be identified based on their differing characteristics. An article could be incorrectly classified and yet still be close to a topic. For candidate negative training examples, the social indexing system embodies an overly-general notion of the breadth of a topic, and a training manager needs to narrow the topic definition by providing more negative training examples. This situation is essentially a dual of near-misses, where the training manager's action broadens the scope of a topic. In both cases, a training manager must interactively adjust the scope of the topic.

TABLE 1

| Case | Characteristics | Trainer Action |
|---|---|---|
| Near-misses (false negative) | Does not match fine-grained topic model. Should match fine-grained topic model. Cue: High score, but does not match. | Add the articles to positive training examples ("more like this example"), which broadens the scope of a topic. |
| Noise Articles (false positive) | Does match fine-grained topic model. Should not match. Cue: Low score, but does match. | Do nothing. The social indexing system will recognize these articles automatically. |
| Candidate Negative Examples (false positive) | Does match fine-grained topic model. Should not match. Cue: High score, but does match. | Add the articles to negative training examples ("not like this example"), which narrows the scope of a topic. |

Variations

The foregoing techniques can also be used in approaches that do not employ machine learning for training. For example, a variant approach to example-trained social indexing is to have users manually specify query patterns for each topic in at topic tree. In this variation, the social indexing system can still compute a coarse-grained topic model. However, instead of relying on positive training examples to define the sample set of articles, the social indexing system can just use the set of articles that match the topic. The sample will not be perfect and will include articles that match noise words. Depending on how well the pattern matches the user's intentions, the pattern may also include articles slightly outside of the intended topic, and miss some articles that were intended. If the sample is mostly right, the pattern can be used as an approximation of the correct sample. A word distribution can be computed and the same signals for re-training can be generated. Here, the user modifies the query and tries again, rather than adjusting positive and negative training examples. Still other training variations are possible.

Conclusion

Coarse-grained topic models can be used to provide an estimate for the distance of an article from the center of a topic, which enables:

(1) Identifying noise pages. Noise pages are it type of false positive match, where a fine-grained topic model matches noise content on a page, but a coarse-grained topic model identifies the page as being mostly not on-topic. Thus, when a fine-grained topic model identifies the page as being on-topic, a coarse-grained topic model will identify the page as being far from the topic center and "noisy,"

(2) Proposing candidate articles for near-misses. Near-misses are a type of false negative match, where a fine-grained topic model does not match the page, but a coarse-grained topic model suggests that the article is near a topic. Adding a candidate near-miss to a set of positive training examples indicates that the scope of the topic should be broadened.

(3) Proposing candidate negative training examples. Negative training examples are articles that help delineate points outside the intended boundaries of a topic. Candidate negative training examples can be scored by a coarse topic model as articles that have been matched by a fine-grained topic model and which are close to or intermediate in distance from a topic center. Unlike noise pages, candidate negative training examples are close in distance to topic centers. Adding a candidate negative training example to the set of negative training examples indicates that the scope of the topic should be narrowed.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing topic narrowing in interactive building of electronically-stored social indexes, comprising:
   electronically-stored data, comprising:
      a corpus of articles each comprised of online textual materials; and
      a hierarchically-structured tree of topics; and
   a social indexing system, comprising:
      a finite state modeler comprising:
         a selection module configured to designate, for each of the topics, a set of the articles in the corpus as on-topic positive training examples; and
         a pattern evaluator configured to find a fine-grained topic model comprising a finite state pattern that matches the on-topic positive training examples, each finite state pattern comprising a pattern evaluable against the articles, wherein the pattern identifies such articles matching the on-topic positive training examples for the corresponding topic;
      a characteristic word modeler configured to generate a coarse-grained topic model for each of the topics corresponding to a center of the topic, comprising:
         a random sampling module configured to randomly select a set of the articles in the corpus, to identify a set of characteristic words in each of the randomly-selected articles, and to determine a frequency of occurrence of each of the characteristic words identified in the set of randomly-selected articles;

a selective sampling module configured to identify a set of characteristic words in each of the articles in the on-topic positive training examples, and to determine a frequency of occurrence of each of the characteristic words identified in the articles in the on-topic training examples; and a scoring module configured to assign a score to each characteristic word as a ratio of the respective frequencies of occurrence of the characteristic word in the articles in the on-topic training examples and in the set of randomly-selected articles;

a filter module configured to filter new articles received into the corpus, comprising:

a matching module configured to match the finite state patterns to each new article;

a characteristic word evaluator configured to identify a set of characteristic words in each new article, and to determine a frequency of occurrence of each of the characteristic words identified in the each article; and a similarity scoring module configured to assign a similarity score to each characteristic word as a ratio of the respective frequencies of occurrence of the characteristic word in the new article and in the set of randomly-selected articles; and a display module configured to order the new articles for each of the topics, comprising:

a new article matching module configured to match the new articles to the finite state pattern of the fine grained topic model for the topic;

a new article comparison module configured to compare, for each new article that matches the fine-grained topic model for the topic, similarity scores for each of the characteristic words identified in the new article to the scores of the corresponding characteristic words in the coarse-grained topic model for the topic; and a display configured to display each of the new articles that was matched by the topic's fine-grained topic model and which has similarity scores close to the topic's coarse-grained topic model's characteristic word scores as candidate articles for negative training examples.

2. A computer-implemented system according to claim 1, further comprising:

the selective sampling module further configured to designate a further subset of the articles in the corpus as additions to the negative training examples; and the pattern evaluator further configured to redefine the finite state patterns to match the on-topic positive training examples and to not match the negative training examples prior to the filtering.

3. A computer-implemented system according to claim 1, further comprising:

the selective sampling module further configured to randomly select a set of the articles in the corpus, which match the finite state patterns as a further fine-grained topic model in lieu of designating a set of the articles in the corpus as the on-topic positive training examples; and a term vector module configured to form term vectors for the characteristic words in each of the articles in the further fine-grained topic model comprising frequencies of occurrence within the further fine-grained topic model, and to average the term vectors.

4. A computer-implemented system according to claim 3, further comprising:

the scoring module further configured to adjust the weight of each of the characteristic words comprising at least one of:

a sample reduction module configured to reduce the weight for each such characteristic word appearing fewer than a minimum number of times in the sampling of the articles;

a character reduction module configured to reduce the weight for each characteristic word comprising a length of less than a minimum number of characters;

a label increase module configured to increase the weight for each characteristic word appearing in an index label of one or more of the articles in the sampling of the articles; and a neighbor increase module configured to increase the weight of each characteristic word either neighboring or appearing adjacent to another characteristic word appearing in an index label of one or more of the articles in the sampling of the articles.

5. A computer-implemented system according to claim 1, further comprising:

the characteristic word modeler further configured at least one of to take cosines of the highest scores of the characteristic words, and to find the highest score within the scores of the characteristic words and to normalize the scores of the remaining characteristic words against the highest score.

6. A computer-implemented method for providing topic narrowing in interactive building of electronically-stored social indexes, comprising:

accessing a corpus of articles each comprised of online textual materials;

specifying a hierarchically-structured tree of topics;

for each of the topics, designating a set of the articles in the corpus as on-topic positive training examples;

finding a fine-grained topic model comprising a finite state pattern that matches the on-topic positive training examples, each finite state pattern comprising a pattern evaluable against the articles, wherein the pattern identifies such articles matching the on-topic positive training examples for the corresponding topic;

for each of the topics, generating a coarse-grained topic model corresponding to a center of the topic comprising:

randomly selecting a set of the articles in the corpus;

identifying a set of characteristic words in each of the randomly-selected articles;

determining a frequency of occurrence of each of the characteristic words identified in the set of randomly-selected articles;

identifying a set of characteristic words in each of the articles in the on-topic positive training examples;

determining a frequency of occurrence of each of the characteristic words identified in the articles in the on-topic training examples; and assigning a score to each characteristic word as a ratio of the respective frequencies of occurrence of the characteristic word in the articles in the on-topic training examples and in the set of randomly-selected articles;

filtering new articles received into the corpus, comprising:

matching the finite state patterns to each new article;

identifying a set of characteristic words in each new article;

determining a frequency of occurrence of each of the characteristic words identified in the each article; and
assigning a similarity score to each characteristic word as a ratio of the respective frequencies of occurrence of the characteristic word in the new article and in the set of randomly-selected articles; and
for each of the topics, ordering the new articles comprising:
matching the new articles to the finite state pattern of the fine-grained topic model for the topic;
for each new article that matches the fine-grained topic model for the topic, comparing similarity scores for each of the characteristic words identified in the new article to the scores of the corresponding characteristic words in the coarse-grained topic model for the topic; and
displaying each of the new articles that was matched by the topic's fine-grained topic model and which has similarity scores close to the topic's coarse-grained topic model's characteristic word scores as candidate articles for negative training examples.

7. A computer-implemented method according to claim 6, further comprising:
designating a further subset of the articles in the corpus as additions to the negative training examples; and
redefining the finite state patterns to match the on-topic positive training examples and to not match the negative training examples prior to the filtering.

8. A computer-implemented method according to claim 6, further comprising:
randomly selecting a set of the articles in the corpus, which match the finite state patterns as a further fine-grained topic model in lieu of designating a set of the articles in the corpus as the on-topic positive training examples;
forming term vectors for the characteristic words in each of the articles in the further fine-grained topic model comprising frequencies of occurrence within the further fine-grained topic model; and
averaging the term vectors.

9. A computer-implemented method according to claim 8, further comprising:
adjusting the weight of each of the characteristic words, comprising at least one of:
reducing the weight for each such characteristic word appearing fewer than a minimum number of times in the sampling of the articles;
reducing the weight for each characteristic word comprising a length of less than a minimum number of characters;
increasing the weight for each characteristic word appearing in an index label of one or more of the articles in the sampling of the articles; and
increasing the weight of each characteristic word either neighboring or appearing adjacent to another characteristic word appearing in an index label of one or more of the articles in the sampling of the articles.

10. A computer-implemented method according to claim 6, further comprising at least one of:
taking cosines of the highest scores of the characteristic words; and
finding the highest score within the scores of the characteristic words and normalizing the scores of the remaining characteristic words against the highest score.

11. A computer-implemented system for providing topic broadening in interactive building of electronically-stored social indexes, comprising:
electronically-stored data, comprising:
a corpus of articles each comprised of online textual materials; and
a hierarchically-structured tree of topics; and
a social indexing system, comprising:
a finite state modeler comprising:
a selection module configured to designate, for each of the topics, a set of the articles in the corpus as on-topic positive training examples; and
a pattern evaluator configured to find a fine-grained topic model comprising a finite state pattern that matches the on-topic positive training examples, each finite state pattern comprising a pattern evaluable against the articles, wherein the pattern identifies such articles matching the on-topic positive training examples for the corresponding topic;
a characteristic word modeler configured to generate a coarse-grained topic model for each of the topics corresponding to a center of the topic, comprising:
a random sampling module configured to randomly select a set of the articles in the corpus, to identify a set of characteristic words in each of the randomly-selected articles, and to determine a frequency of occurrence of each of the characteristic words identified in the set of randomly-selected articles;
a selective sampling module configured to identify a set of characteristic words in each of the articles in the on-topic positive training examples, and to determine a frequency of occurrence of each of the characteristic words identified in the articles in the on-topic training examples; and
a scoring module configured to assign a score to each characteristic word as a ratio of the respective frequencies of occurrence of the characteristic word in the articles in the on-topic training examples and in the set of randomly-selected articles;
a filter module configured to filter new articles received into the corpus, comprising:
a matching module configured to match the finite state patterns to each new article;
a characteristic word evaluator configured to identify a set of characteristic words in each new article, and to determine a frequency of occurrence of each of the characteristic words identified in the each article; and
a similarity scoring module configured to assign a similarity score to each characteristic word as a ratio of the respective frequencies of occurrence of the characteristic word in the new article and in the set of randomly-selected articles; and
a display module configured to order the new articles for each of the topics, comprising:
a new article matching module configured to match the new articles to the finite state pattern of the fine-grained topic model for the topic;
a new article comparison module configured to compare, for each new article that does not match the fine-grained topic model for the topic, similarity scores for each of the characteristic words identified in the new article to the scores of the corresponding characteristic words in the coarse-grained topic model for the topic; and
a display configured to display each of the new articles that was not matched by the topic's fine-grained topic model and which has similarity scores close to the topic's coarse-grained topic model's characteristic word scores as candidate articles for additional positive training examples.

12. A computer-implemented system according to claim 11, further comprising:
the selective sampling module further configured to designate a further subset of the non-matching articles in the corpus as topic-broadening positive training examples; and
the pattern evaluator further configured to redefine the finite state patterns to match the on-topic positive training examples and the topic-broadening positive training examples and to not match the negative training examples prior to the filtering.

13. A computer-implemented system according to claim 11, further comprising:
the selective sampling module further configured to randomly select a set of the articles in the corpus, which match the finite state patterns as a further fine-grained topic model in lieu of designating a set of the articles in the corpus as the on-topic positive training examples; and
a term vector module configured to form term vectors for the characteristic words in each of the articles in the further fine-grained topic model comprising frequencies of occurrence within the further fine-grained topic model, and to average the term vectors.

14. A computer-implemented system according to claim 13, further comprising:
the scoring module further configured to adjust the weight of each of the characteristic words comprising at least one of:
a sample reduction module configured to reduce the weight for each such characteristic word appearing fewer than a minimum number of times in the sampling of the articles;
a character reduction module configured to reduce the weight for each characteristic word comprising a length of less than a minimum number of characters;
a label increase module configured to increase the weight for each characteristic word appearing in an index label of one or more of the articles in the sampling of the articles; and
a neighbor increase module configured to increase the weight of each characteristic word either neighboring or appearing adjacent to another characteristic word appearing in an index label of one or more of the articles in the sampling of the articles.

15. A computer-implemented system according to claim 11, further comprising:
the characteristic word modeler further configured at least one of to take cosines of the highest scores of the characteristic words, and to find the highest score within the scores of the characteristic words and to normalize the scores of the remaining characteristic words against the highest score.

16. A computer-implemented method for providing topic broadening in interactive building of electronically-stored social indexes, comprising:
accessing a corpus of articles each comprised of online textual materials;
specifying a hierarchically-structured tree of topics;
for each of the topics, designating a set of the articles in the corpus as on-topic positive training examples;
finding a fine-grained topic model comprising a finite state pattern that matches the on-topic positive training examples, each finite state pattern comprising a pattern evaluable against the articles, wherein the pattern identifies such articles matching the on-topic positive training examples for the corresponding topic;
for each of the topics, generating a coarse-grained topic model corresponding to a center of the topic comprising:
randomly selecting a set of the articles in the corpus;
identifying a set of characteristic words in each of the randomly-selected articles;
determining a frequency of occurrence of each of the characteristic words identified in the set of randomly-selected articles;
identifying a set of characteristic words in each of the articles in the on-topic positive training examples;
determining a frequency of occurrence of each of the characteristic words identified in the articles in the on-topic training examples; and
assigning a score to each characteristic word as a ratio of the respective frequencies of occurrence of the characteristic word in the articles in the on-topic training examples and in the set of randomly-selected articles;
filtering new articles received into the corpus, comprising:
matching the finite state patterns to each new article;
identifying a set of characteristic words in each new article;
determining a frequency of occurrence of each of the characteristic words identified in the each article; and
assigning a similarity score to each characteristic word as a ratio of the respective frequencies of occurrence of the characteristic word in the new article and in the set of randomly-selected articles; and
for each of the topics, ordering the new articles comprising:
matching the new articles to the finite state pattern of the fine-grained topic model for the topic;
for each new article that does not match the fine-grained topic model for the topic, comparing similarity scores for each of the characteristic words identified in the new article to the scores of the corresponding characteristic words in the coarse-grained topic model for the topic; and
displaying each of the new articles that was not matched by the topic's fine-grained topic model and which has similarit scores close to the topic's coarse-grained topic model's characteristic word scores articles as candidate articles for additional positive training examples.

17. A computer-implemented method according to claim 16, further comprising:
accepting designations by a user of a further subset of the non-matching articles in the corpus as topic-broadening positive training examples; and
redefining the finite state patterns to match the on-topic positive training examples and the topic-broadening positive training examples and to not match the negative training examples prior to the filtering.

18. A computer-implemented method according to claim 16, further comprising:
randomly selecting a set of the articles in the corpus, which match the finite state patterns as a further fine-grained topic model in lieu of designating a set of the articles in the corpus as the on-topic positive training examples;
forming term vectors for the characteristic words in each of the articles in the further fine-grained topic model comprising frequencies of occurrence within the further fine-grained topic model; and
averaging the term vectors.

19. A computer-implemented method according to claim 18, further comprising:
  adjusting the score of each of the characteristic words, comprising at least one of:
    reducing the score for each such characteristic word appearing fewer than a minimum number of times in the sampling of the articles;
    reducing the score for each characteristic word comprising a length of less than a minimum number of characters;
    increasing the score for each characteristic word appearing in an index label of one or more of the articles in the sampling of the articles; and
    increasing the score of each characteristic word either neighboring or appearing adjacent to another characteristic word appearing in an index label of one or more of the articles in the sampling of the articles.

20. A computer-implemented method according to claim 16, further comprising:
  finding the highest score within the scores of the characteristic words; and
  normalizing the scores of the remaining characteristic words against the highest score.

21. A computer-implemented system for providing robustness against noise during interactive building of electronically-stored social indexes, comprising:
  electronically-stored data, comprising:
    a corpus of articles each comprised of online textual materials; and
    a hierarchically-structured tree of topics; and
  a social indexing system, comprising:
    a finite state modeler comprising:
      a selection module configured to designate, for each of the topics, a set of the articles in the corpus as on-topic positive training examples; and
      a pattern evaluator configured to find a fine-grained topic model comprising a finite state pattern that matches the on-topic positive training examples, each finite state pattern comprising a pattern evaluable against the articles, wherein the pattern identifies such articles matching the on-topic positive training examples for the corresponding topic;
    a characteristic word modeler configured to generate a coarse-grained topic model for each of the topics corresponding to a center of the topic, comprising:
      a random sampling module configured to randomly select a set of the articles in the corpus, to identify a set of characteristic words in each of the randomly-selected articles, and to determine a frequency of occurrence of each of the characteristic words identified in the set of randomly-selected articles;
      a selective sampling module configured to identify a set of characteristic words in each of the articles in the on-topic positive training examples, and to determine a frequency of occurrence of each of the characteristic words identified in the articles in the on-topic training examples; and
      a scoring module configured to assign a score to each characteristic word as a ratio of the respective frequencies of occurrence of the characteristic word in the articles in the on-topic training examples and in the set of randomly-selected articles;
    a filter module configured to filter new articles received into the corpus, comprising:
      a matching module configured to match the finite state patterns to each new article;
      a characteristic word evaluator configured to identify a set of characteristic words in each new article, and to determine a frequency of occurrence of each of the characteristic words identified in the each article; and
      a similarity scoring module configured to assign a similarity score to each characteristic word as a ratio of the respective frequencies of occurrence of the characteristic word in the new article and in the set of randomly-selected articles; and
    a display module configured to order the new articles for each of the topics, comprising:
      a new article matching module configured to match the new articles to the finite state pattern of the fine-rained to is model for the topic;
      a new article comparison module configured to compare, for each new article that matches the fine-grained topic model for the topic, similarity scores for each of the characteristic words identified in the new article to the scores of the corresponding characteristic words in the coarse-grained topic model for the topic; and
      a display configured to display each of the new articles that was matched by the topic's fine-grained topic model and which has similarity scores far from the topic's coarse-grained topic model's characteristic word scores as candidate noise articles.

22. A computer-implemented method for providing robustness against noise during interactive building of electronically-stored social indexes, comprising:
  accessing a corpus of articles each comprised of online textual materials;
  specifying a hierarchically-structured tree of topics;
  for each of the topics, designating a set of the articles in the corpus as on-topic positive training examples;
  finding a fine-grained topic model comprising a finite state pattern that matches the on-topic positive training examples, each finite state pattern comprising a pattern evaluable against the articles, wherein the pattern identifies such articles matching the on-topic positive training examples for the corresponding topic;
  for each of the topics, generating a coarse-grained topic model corresponding to a center of the topic comprising:
    randomly selecting a set of the articles in the corpus;
    identifying a set of characteristic words in each of the randomly-selected articles;
    determining a frequency of occurrence of each of the characteristic words identified in the set of randomly-selected articles;
    identifying a set of characteristic words in each of the articles in the on-top positive training examples;
    determining a frequency of occurrence of each of the characteristic words identified in the articles in the on-topic training examples; and
    assigning a score to each characteristic word as a ratio of the respective frequencies of occurrence of the characteristic word in the articles in the on-topic training examples and in the set of randomly-selected articles;
  filtering new articles received into the corpus, comprising:
    matching the finite state patterns to each new article;
    identifying a set of characteristic words in each new article;
    determining a frequency of occurrence of each of the characteristic words identified in the each article; and
    assigning a similarity score to each characteristic word as a ratio of the respective frequencies of occurrence of the characteristic word in the new article and in the set of randomly-selected articles; and for each of the topics, ordering the new articles comprising:
matching the new articles to the finite state pattern of the fine-grained topic model for the topic;
for each new article that matches the fine-grained topic model for the topic, comparing similarity scores for each of the characteristic words identified in the new article to the scores of the corresponding characteristic words in the coarse-grained topic model for the topic; and
displaying each of the new articles that was matched by the topic's fine-grained topic model and which has similarity scores far from the topic's coarse-grained topic model's characteristic word scores as candidate noise articles.

* * * * *